US010819685B2

(12) United States Patent
Eckert et al.

(10) Patent No.: US 10,819,685 B2
(45) Date of Patent: Oct. 27, 2020

(54) LIGHTWEIGHT SECURE AUTONOMIC CONTROL PLANE

(71) Applicant: Futurewei Technologies, Inc., Plano, TX (US)

(72) Inventors: Toerless Eckert, Mountain View, CA (US); Sheng Jiang, Shenzhen (CN); Bing Liu, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 287 days.

(21) Appl. No.: 15/910,947

(22) Filed: Mar. 2, 2018

(65) Prior Publication Data

US 2019/0273727 A1  Sep. 5, 2019

(51) Int. Cl.
*H04L 29/06* (2006.01)
*H04L 12/715* (2013.01)
(Continued)

(52) U.S. Cl.
CPC ...... *H04L 63/0428* (2013.01); *H04L 63/1441* (2013.01); *H04L 63/166* (2013.01);
(Continued)

(58) Field of Classification Search
CPC ... H04L 63/0428; H04L 45/02; H04L 63/166; H04L 63/1441; H04L 41/00; H04L 41/12;
(Continued)

(56) References Cited

U.S. PATENT DOCUMENTS 8,165,023 B2\*  4/2012  Khalid ............... H04L 12/2854
                                              370/235
8,705,513 B2\*  4/2014  Van Der Merwe ..... H04L 47/72
                                              370/351
(Continued)

FOREIGN PATENT DOCUMENTS

WO  2017011948 A1  1/2017
WO  2017066574 A1  4/2017

OTHER PUBLICATIONS

Behringer et al. An Autonomic Control Plane, draft-ietf-anima-autonomic-control-plane-03, Jun. 30, 2015 (Year: 2015).\*
(Continued)

*Primary Examiner* — Ali S Abyaneh
*Assistant Examiner* — Shu Chun Gao
(74) *Attorney, Agent, or Firm* — Conley Rose, P.C.

(57) ABSTRACT

A network device includes a transmitter and a receiver to establish a secure connection with one or more network nodes as part of a Autonomic Control Plane (ACP) network. The network device also includes a processor coupled to the transmitter and receiver. The processor receives a request from an application to initiate a connection with a destination network node. The processor also receives packets from the application for transmission toward the destination network node. When the packets from the application are unencrypted, the processor end-to-end encrypts the unencrypted packets without notifying the application. The transmitter then transmits the encrypted packets towards the destination network node across the ACP network.

20 Claims, 10 Drawing Sheets

(51) Int. Cl.
 *H04L 12/751* (2013.01)
 *H04L 29/08* (2006.01)

(52) U.S. Cl.
 CPC .............. *H04L 45/02* (2013.01); *H04L 45/64* (2013.01); *H04L 67/1089* (2013.01)

(58) Field of Classification Search
 CPC ..... H04L 45/66; H04L 69/32; H04L 2212/00; H04W 4/005; H04W 12/08; H04W 4/70; H04W 41/12; H04W 12/06; H04W 63/0823; H04W 41/22
 See application file for complete search history.

(56) References Cited

U.S. PATENT DOCUMENTS

| | | | |
|---|---|---|---|
| 9,391,959 B2 | 7/2016 | Bjarnason et al. | |
| 2008/0101240 A1* | 5/2008 | Rohilla | H04L 63/0272 370/236 |
| 2011/0280213 A1* | 11/2011 | Calhoun | H04W 76/12 370/331 |
| 2013/0311778 A1* | 11/2013 | Cherukuri | H04L 63/0272 713/171 |
| 2014/0192808 A1* | 7/2014 | Thubert | H04L 45/64 370/392 |
| 2015/0304427 A1* | 10/2015 | Ortacdag | H04L 63/164 713/160 |
| 2017/0207986 A1* | 7/2017 | Sundaram | G06F 16/1744 |
| 2018/0145981 A1 | 5/2018 | Du et al. | |
| 2018/0302290 A1* | 10/2018 | Rahman | H04W 4/70 |
| 2019/0190891 A1* | 6/2019 | Pillai | H04L 63/0428 |

OTHER PUBLICATIONS

Bormann et al. A Generic Autonomic Signaling Protocol (GRASP), draft-ietf-anima-grasp-09, Dec. 15, 2016 (Year: 2016).*
Behringer et al. An Autonomic Control Plane, draft-behringer-anima-autonomic-control-plane-05, Jan. 11, 2017 (Year: 2017).*
Behringer, Ed., et al., "An Autonomic Control Plane (ACP)," draft-ietf-anima-autonomic-control-plane-12, Oct. 12, 2017, 106 pages.
Foreign Communication From A Counterpart Application, PCT Application No. PCT/CN2019/076131, English Translation of International Search Report dated May 16, 2019, 5 pages.
Foreign Communication From A Counterpart Application, PCT Application No. PCT/CN2019/076131, English Translation of Written Opinion dated May 16, 2019, 3 pages.

* cited by examiner

LIGHTWEIGHT SECURE AUTONOMIC CONTROL PLANE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Networks can be configured to communicate various types of traffic. In many cases, users desire that such communications occur in a secure fashion to prevent access by unauthorized parties. However, increasing security increases communication complexity. Increased communication complexity may render certain network components obsolete, require complicated configurations on network components, and/or slow overall communication speed. Accordingly, a communication network design should balance security needs with communication needs in order to create a network that is both reasonably secure and reasonably effective in performing communication tasks.

SUMMARY

In an embodiment, the disclosure includes a network device comprising: a transmitter and a receiver to establish a secure connection with one or more network nodes as part of a Autonomic Control Plane (ACP) network, and a processor coupled to the transmitter and receiver, the processor to: receive a request from an application to initiate a connection with a destination network node, receive packets from the application for transmission toward the destination network node, when the packets from the application are unencrypted, end-to-end encrypting the unencrypted packets without notifying the application, and cause the transmitter to transmit the encrypted packets towards the destination network node across the ACP network.

Optionally, in any of the preceding aspects, another implementation of the aspect provides the processor is further configured to perform no additional encryption when the packets from the application are encrypted by the application. Optionally, in any of the preceding aspects, another implementation of the aspect provides the unencrypted packets are encrypted by the processor according to a Transport layer security (TLS) protocol, a datagram transport layer security protocol (dTLS), or combinations thereof. Optionally, in any of the preceding aspects, another implementation of the aspect establishing a secure connection with one or more network nodes includes transmitting encryption discovery unsolicited link local (NULL) Generic Autonomic Signaling Protocol (GRASP) discovery messages to the network nodes, establishing a secure Transport layer security (TLS) connection for authentication, and unblocking ports corresponding to authenticated network nodes. Optionally, in any of the preceding aspects, another implementation of the aspect provides establishing a secure connection with one or more network nodes further includes establishing multicast link-local communication connections with adjacent network nodes. Optionally, in any of the preceding aspects, another implementation of the aspect provides the network device of claim 1, wherein the processor is further configured to determine that the destination network node is reachable via the ACP network prior to initiating a connection with the destination network node by employing an ACP routing table. Optionally, in any of the preceding aspects, another implementation of the aspect provides the ACP routing table is populated by receiving Virtual Routing and Forwarding (VRF) addresses of network nodes in the ACP network as flooded by an ACP routing protocol. Optionally, in any of the preceding aspects, another implementation of the aspect provides the processor is further configured to determine that the destination network node is reachable via the ACP network prior to initiating a connection with the destination network node by employing an address mapping service to determine an ACP Virtual Routing and Forwarding (VRF) address for the destination network node. Optionally, in any of the preceding aspects, another implementation of the aspect provides the address mapping service: employs the transmitter to flood a ACP Generic Autonomic Signaling Protocol (GRASP) discovery message across the ACP network, and employs the receiver to receive the VRF for the destination network node in GRASP respond message in response to the GRASP discovery message. Optionally, in any of the preceding aspects, another implementation of the aspect provides the network device of claim 1, wherein transmitting the encrypted packets towards the destination network node across the ACP network includes tagging the encrypted packets to indicate membership in the ACP network, and blocking all packets except for tagged packets and ACP network discovery packets. Optionally, in any of the preceding aspects, another implementation of the aspect provides transmitting the encrypted packets towards the destination network node across the ACP network includes multicasting the encrypted packets by creating a plurality of secure end-to-end connections with a plurality of adjacent network nodes, and unicasting the encrypted packets over the secure end-to-end connections. Optionally, in any of the preceding aspects, another implementation of the aspect provides the processor is further configured to protect the secure connection against man-in-the-middle attacks by exchanging interface sent/received packet/byte counters and corresponding timestamps with adjacent network nodes in the ACP network, and determining an intruder when a difference in a sent packet counter and a received packet counter over a specified time period exceeds an error threshold.

In an embodiment, the disclosure includes a method, implemented in a network device, the method comprising establishing, via a transmitter and receiver, a secure connection with one or more network nodes as part of an Autonomic Control Plane (ACP) network, and receiving, at a processor, a request from an application to initiate a connection with a destination network node, receiving, at the processor, packets from the application for transmission toward the destination network node, when the packets from the application are unencrypted, end-to-end encrypt the unencrypted packets without notifying the application, and transmitting, at the transmitter, the encrypted packets towards the destination network node across the ACP network.

Optionally, in any of the preceding aspects, another implementation of the aspect provides the unencrypted packets are link local multicast packets for a ACP routing protocol, and wherein end-to-end encrypting the unencrypted packets includes: converting the unencrypted packets to a list of unicast packets, and encrypting the unicast packets according to a datagram transport layer security (dTLS) protocol, and transmitting the encrypted unicast packets as link-local unicast to neighboring network nodes. Optionally, in any of the preceding aspects, another implementation of the aspect provides establishing the secure connection with one or more network nodes includes authenticating adjacent network nodes in the ACP network according to an encryption discovery unsolicited link local (NULL) Generic Autonomic Signaling Protocol (GRASP) protocol. Optionally, in any of the preceding aspects, another implementation of the aspect provides protecting the secure connection against man-in-the-middle attacks by exchanging packet counters and corresponding timestamps with adjacent network nodes in the ACP network, and determining an intruder when a difference in a sent packet counter and a received packet counter over a specified time period exceeds an error threshold calculated based on accuracy tolerance.

In an embodiment, the disclosure includes a non-transitory computer readable medium comprising a computer program product for use by a network device, the computer program product comprising computer executable instructions stored on the non-transitory computer readable medium such that when executed by a processor cause the network device to: establish a secure connection with one or more network nodes as part of an Autonomic Control Plane (ACP) network, and receive a request from an application to initiate a connection with a destination network node, receive packets from the application for transmission toward the destination network node, when the packets from the application are unencrypted, end-to-end encrypt the unencrypted packets without notifying the application, and transmit the encrypted packets towards the destination network node across the ACP network.

Optionally, in any of the preceding aspects, another implementation of the aspect provides the unencrypted packets are encrypted according to a datagram transport layer security (dTLS) protocol and transmitted as link local Internet protocol version six (IPv6) Routing Protocol For Low Power and Lossy Networks (RPL) multicast packets. Optionally, in any of the preceding aspects, another implementation of the aspect provides establishing the secure connection with one or more network nodes includes authenticating adjacent network nodes in the ACP network according to a Generic Autonomic Signaling Protocol (GRASP) protocol. Optionally, in any of the preceding aspects, another implementation of the aspect provides the computer executable instructions further cause the network device to protect the secure connection against man-in-the-middle attacks by exchanging packet counters and corresponding timestamps with adjacent network nodes in the ACP network, and determining an intruder when a difference in a sent packet counter and a received packet counter over a specified time period exceeds an error threshold.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
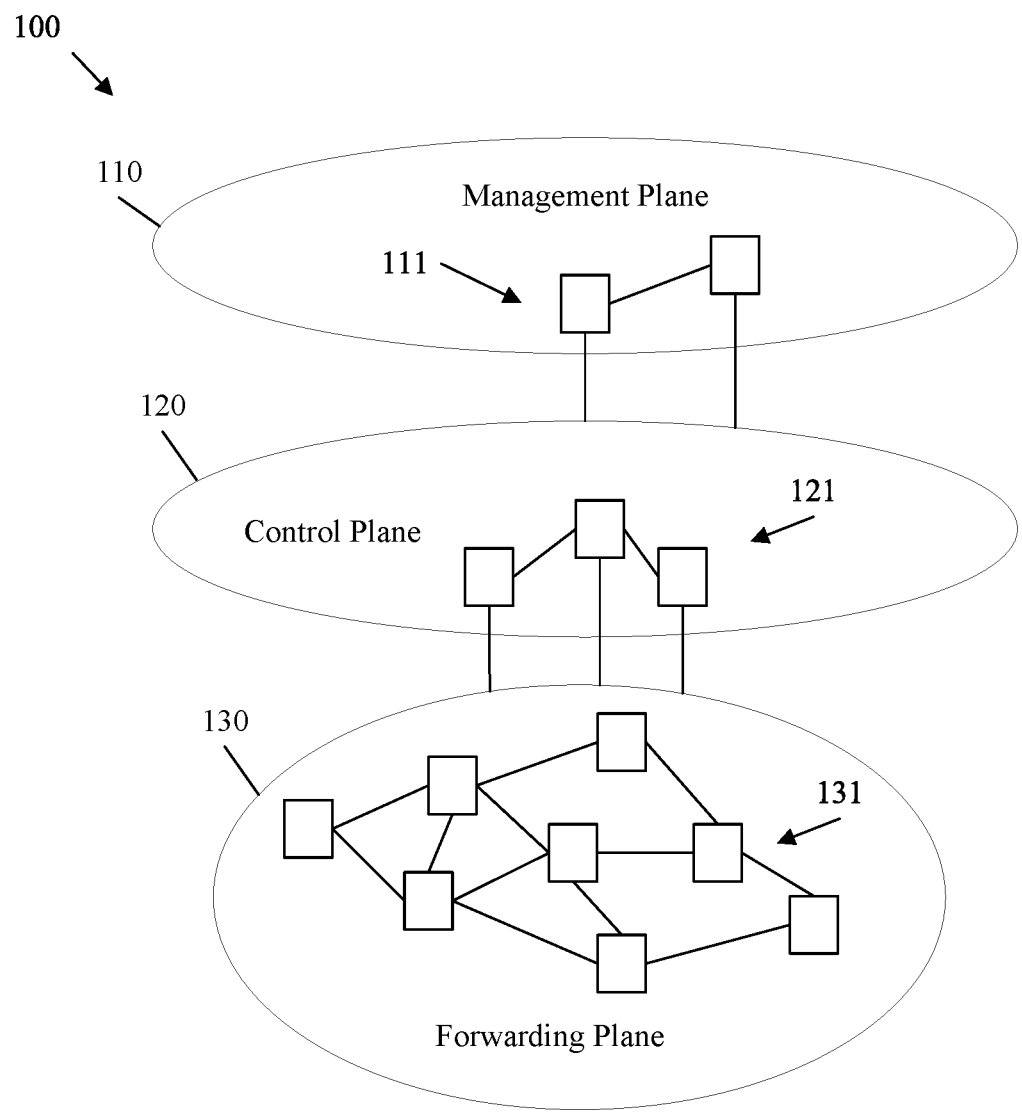
FIG. 1 is a schematic diagram of an example multi-layered network.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Autonomic Network Infrastructure (ANI) is an example communications network paradigm under development before the Internet Engineering Task Force (IETF) Autonomic Networking Integrated Model and Approach (ANIMA) working group. ANI employs an ACP, which is a secure, zero-touch, and indestructible hop-by-hop virtual in-band network for use in conjunction with various network designs such as Software Defined Networks (SDNs) and other distributed autonomic network deployments. ACP employs various security procedures. For example, ACP employs hop-by-hop encryption of ACP packets. ACP also employs security signaling protocols such as Internet Protocol Security (IPsec) and/or datagram transport layer security (dTLS) protocols. Such a security model provides a complete security-isolated context for ACP. However, the hop-by-hop security model may not be easily deployed in some cases. For example, many network devices may not support sufficient performance, scalable encryption, and/or hardware acceleration to implement ACP. Accordingly, ACP may not be successfully supported by a wide variety of cost-conscious equipment.

Disclosed herein are mechanisms to operate a LS-ACP based network. The LS-ACP network is capable of providing network security despite the presence of non-ACP compliant devices in the network. The LS-ACP network is also capable of providing security at an end-to-end application level even when user applications are not setup to properly employ security procedures. A network device operating LS-ACP establishes secure connections with adjacent network nodes on startup only for mutual authentication and related control, but not to protect user data. For example, the network device may transmit Generic Autonomic Signaling Protocol (GRASP) discovery messages on all ports upon startup to authenticate adjacent network nodes as LS-ACP compliant. The network device then establishes multicast link-local communication channels with the LS-ACP compliant nodes for such mutual authentication. The LS-ACP network nodes tag LS-ACP network traffic to distinguish such traffic from non-LS-ACP traffic. Before mutual authentication succeeds, the network device maintains security in the LS-ACP network by dropping LS-ACP tagged packets that are not required for authentication. As a choice of policy, the LS-ACP network may also drop non-tagged packets before successful mutual authentication. The network device operates a forced transport shim, so applications do not need to implement new functionality to operate over the LS-ACP. Specifically, the forced transport shim employs an initiator that supports socket communication requests from an application (e.g., upon user request, upon occurrence of a specified condition, etc.). The initiator then determines whether the application request is properly configured to employ end-to-end security. If not, the initiator configures end-to-end security, if possible, without notifying/altering the application configuration. The initiator also determines if the socket communication request is addressed to a remote network node by an LS-ACP Virtual Routing and Forwarding (VRF) address or merely a non-LS-ACP network address. If no LS-ACP address is provided, the initiator determines the appropriate LS-ACP address for the remote network node if possible, because passing traffic across the LS-ACP network is more reliable than passing traffic outside the LS-ACP network. In some examples, the network device may maintain LS-ACP routing tables that correlate LS-ACP addresses and network addresses of network nodes in the LS-ACP network. Such LS-ACP routing tables may be populated by GRASP response messages flooded across the LS-ACP network that contain the VRF addresses and network addresses of the corresponding nodes. In other examples, an address mapping service may be employed upon demand. Specifically, GRASP discovery messages may be transmitted upon request from an application, and a GRASP response message may be sent directly by the address mapping service without flooding. In any case, when the remote network node is LS-ACP compliant, the forced transport shim determines the VRF for the remote network node and sets up a multicast communication over the LS-ACP VRF. When the remote network node is not LS-ACP compliant, the forced transport shim routes the packet outside of the LS-ACP network. The initiator also examines packets from the application to determine whether the application has been configured to use end-to-end encryption. When encryption is properly employed by the application, the forced transport shim forwards such packets across the ACP network as is. When the packets are unencrypted, the forced transport shim encrypts such packets prior to transmission, for example by employing transport layer security (TLS) protocol and/or dTLS protocol. The forced shim initiator is not only applied to application traffic but also to the protocols used by the LS-ACP. For example, the forced shim initiator applies GRASP across the LS-ACP and routing protocols such as Internet protocol version six (IPv6) Routing Protocol For Low Power and Lossy Networks (RPL). Unlike application traffic, these routing protocols are configured to employ link-local multicast packets. These packets are replicated over secure transport connections established by the initial GRASP discover. This scheme ensures that all packets are encrypted and forwarded through the LS-ACP network, if possible, even when the application or LS-ACP protocol is unaware of such security features. The network device may also be auto-configured to protect the authenticated neighbor connections in the-LS-ACP network against man-in-the-middle attacks. In some examples, the network device may periodically exchange packet counters and corresponding timestamps with adjacent network nodes in the LS-ACP network relying on counting mechanisms in network devices. The network device may then detect an intruder injecting extra (or extracting) packets when a difference in a sent packet counter and a received packet counter over a specified time period exceeds an error threshold.

FIG. 1 is a schematic diagram of an example multi-layered network 100. Network 100 includes a forwarding plane 130, a control plane 120, and a management plane 110. The forwarding plane 130, which may also be referred to as the data plane, includes a network of interconnected communication nodes 131. The communication nodes 131 may include routers, switches, virtual routers, virtual switches, and/or any other components capable for forwarding a communications packet and/or frame between nodes 131. The forwarding plane 130 employs various protocols to communicate packets across the forwarding plane 130 based on node 131 addresses and/or port connections. The control plane 120 controls the operation of the forwarding plane 130. The control plane 120 employs various control nodes 121 to manage such communications. For example, the nodes 121 of the control plane 120 may be configured with various discovery protocols to determine and inform the nodes 131 of addresses and connections of other nodes 131. Hence, the control plane 120 may indicate to the forwarding plane 130 any actions desired to communicate a packet, and the forwarding plane 130 may then follow such instructions to cause the communication to occur. It should be noted that some physical components may employ functions of multiple planes, and hence operate on multiple planes. For example, a router may forward data and manage routing protocols, and hence act as both a communication node 131 and a control node 121. The management plane 110 manages the operation of the control plane 120 and the forwarding plane 130. For example, the management plane 110 may operate various applications that process the communicated packets and/or generate additional responsive packets. For example, the management plane 110 may employ management nodes 111 that receive, process, and/or generate new packets for further communication. The management nodes 111 may also reconfigure the network 100 for changing user needs, alter resource allocations, perform operations and maintenance tasks, and configure communication sessions that employ the control plane 120 and the forwarding plane 130, etc. Accordingly, network 100 applications may operate on the management nodes 111. As with the forwarding plane 130 and the control plane 120, nodes 111 may employ functionality of more than one plane, and hence a single hardware component may act as a node 111, 121, and/or 131 in some examples.

Figure 2:
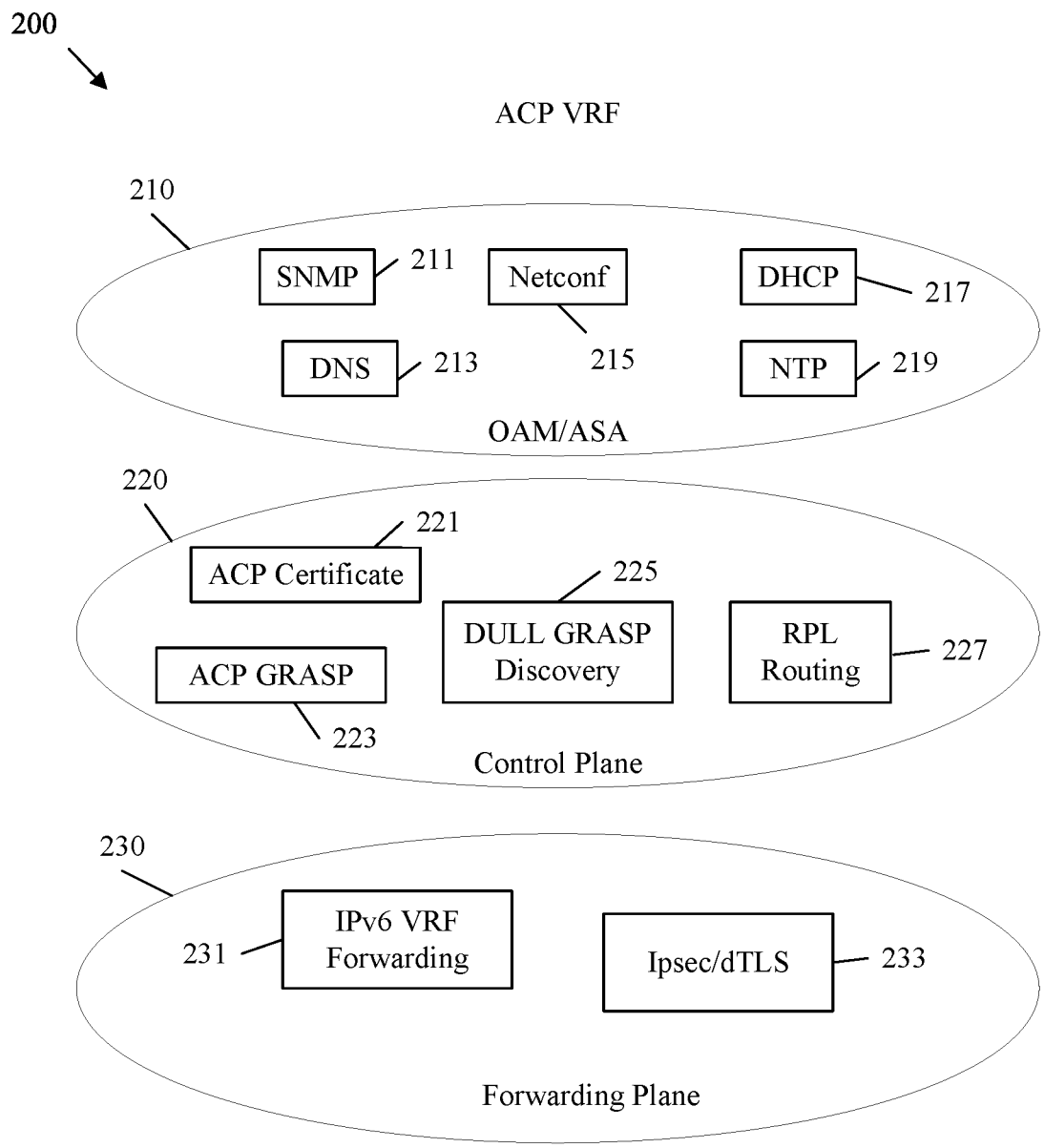
FIG. 2 is a schematic diagram of example functions for the layers of a network device configured according to an Autonomic Control Plane (ACP) specification.

FIG. 2 is a schematic diagram of example functions for the layers of a network device 200 configured according to an Autonomic Control Plane (ACP) specification. An ACP network created by a group of network devices 200 is employed to create a separate virtual network in a network 100. This virtual network includes a separate control plane instance and forwarding plane instance, which are logically separated from the physical forwarding plane of the network. The management plane 110 can be shared across the ACP virtual network and the physical network. The ACP virtual network provides secure and reliable connectivity for communications between management nodes 111 in different network devices and for communications between management nodes 111 and control nodes 121 in different network devices.

The ACP network device 200 includes functions that support ACP VRF in a network such as network 100. ACP network device 200 includes management plane 210 functions (e.g., applications) that perform operations, administration, and management (OAM) as well as act as part of an Autonomic Service Agents (ASA). Such functions may be employed on nodes 111 to implement a management plane 110. For example, the management plane 210 may include a Simple Network Management Protocol (SNMP) 211 application, Domain Name System (DNS) 213 application, a Network Configuration Protocol (Netconf) 215 application, a Dynamic Host Configuration Protocol (DHCP) 217 application, a Network Time Protocol (NTP) 219 application, etc. It should be noted that the listed applications are provided as examples, and many other applications may be employed in a management plane 210. In this example, the SNMP 211 is an application configured to organize information related to network nodes in an internet protocol (IP) network and modify such information to control the behavior of such network nodes. DNS 213 is an application that converts domain names into IP addresses that map to corresponding network nodes, which in turn allows users to communicate with requested services over the Internet. Netconf 215 is an application configured to install, change, and/or delete configurations on network devices/nodes. DHCP 217 is an application configured to dynamically assign addresses and other network parameters to network nodes to allow the nodes to communicate with other IP networks. NTP 219 is an application configured to manage clock synchronization between computer systems over packet switched networks. As can be seen, the management plane 210 functions manage the overall operation of the ACP network device 200 and may manage operations in corresponding network nodes in the ACP network.

ACP network device 200 also includes control plane 220 functions. Such functions may be employed to control packet routing, and hence may be employed on nodes 121 to implement a control plane 120. For example, the control plane 220 may include an ACP certificate 221 function, an ACP GRASP 223 function, a Discovery Unsolicited Link Local (DULL) GRASP discovery 225 function, and a RPL routing 227 function. It should be noted that the listed functions are provided as examples, and many other routing functions may be employed in a control plane 220. The ACP certificate 221 function is configured to store and communicate certificates between network nodes as well as authenticate such certificates. The ACP certificate 221 function is employed to establish a trusted relationship between ACP network nodes. Heightened security is applied to non-trusted network nodes (e.g., packets may be blocked/dropped by a receiving node until authentication occurs). The ACP GRASP 223 function creates GRASP communication instances with neighboring trusted nodes. For example, the ACP GRASP 223 function communicates network packets with neighboring nodes that have been authenticated according to the ACP certificate 221 function (as part of an ACP network) and drops packets from network nodes that have not been properly authenticated. The ACP GRASP 223 function may communicate via unicast (e.g., point-to-point communication) and/or via link-local multicast (e.g., multicast packets to a group of receivers that share a common link, are neighbor nodes, and/or are part of a common GRASP instance). The ACP GRASP 223 function may also perform service discovery and/or flood corresponding packets to neighboring network nodes as desired. The DULL GRASP discovery 225 function is configured to discover other ACP compliant network nodes. For example, the DULL GRASP discovery 225 function may communicate with adjacent network nodes to discover corresponding addresses and/or initiate authentication with such network nodes according to the ACP certificate 221 function. As such, the DULL GRASP discovery 225 function may initiate a process to authenticate other network nodes into a common GRASP instance for further communication by the ACP GRASP 223 function. The RPL routing 227 function is configured to generate and/or maintain a set of virtual addresses for network nodes in the ACP network. Accordingly, the RPL routing 227 function allows for the creation of one or more virtual networks within a network. Authenticated network nodes that are part of the ACP network receive virtual addresses from the RPL routing 227 function. As such, the RPL routing 227 function indicates to the other routing functions how packets should be routed within the physical network while staying within the authenticated ACP network.

ACP network device 200 also includes forwarding plane 230 functions. Such functions may be employed to forward packets based on information from the control plane 220, and hence may be employed on nodes 131 to implement a forwarding plane 130. For example, the forwarding plane 230 may include an IPv6 VRF forwarding 231 function and a IPsec/dTLS 233 function. It should be noted that the listed functions are provided as examples, and many other routing functions may be employed in a forwarding plane 230. The IPv6 VRF forwarding 231 function is configured to forward packets across the ACP network and toward a destination via local port(s) by employing a VRF address associated with the destination network node. Such VRF addresses may be obtained from the RPL routing 227 function. The IPsec/dTLS 233 function encrypts all traffic being forwarded across the ACP network by the IPv6 VRF forwarding 231 function.

ACP network provides high levels of security for network traffic when all devices on the network are ACP compliant and properly configured. However, an ACP network has certain drawbacks. For example, the forwarding plane 230 may force additional encryption and decryption by every hop 131 in the network on packets regardless of whether or not they have already been encrypted by applications in the management plane 210. In addition, ACP network may be unable to properly route packets when the management plane 210 applications have not been properly configured with VRF addresses of destination nodes. In such cases, packets may simply be discarded as the RPL routing 227 function may be unable to route such packets without a recognizable VRF address. As discussed below, network device 300 addresses these and other issues with the ACP network operated by ACP network devices such as network device 200.

Figure 3:
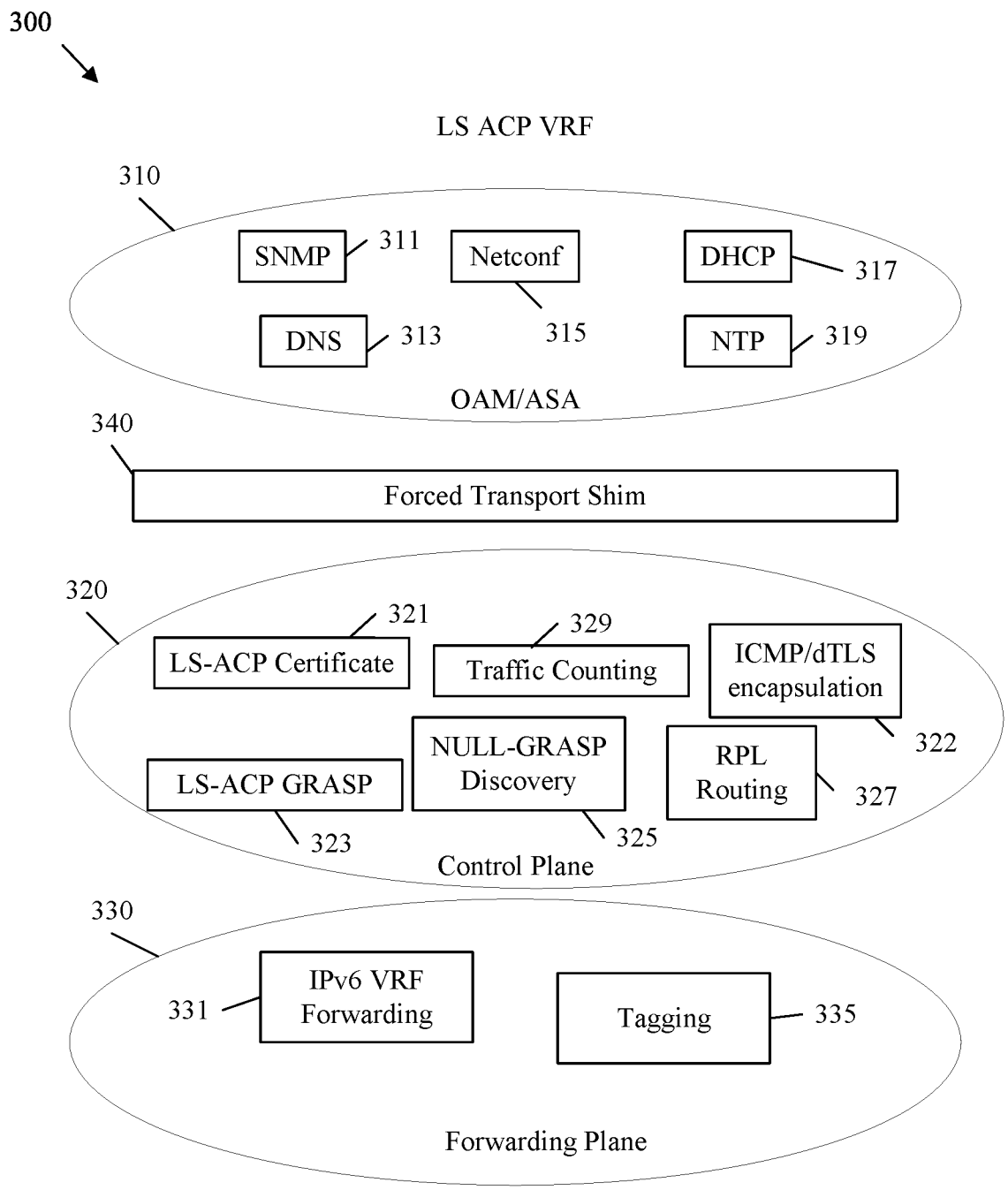
FIG. 3 is a schematic diagram of example functions for a multi-layered network device configured according to a Lightweight Secured Autonomic Control Plane (LS-ACP) protocol.

FIG. 3 is a schematic diagram of example functions for a multi-layered network device 300 configured according to a Lightweight Secured Autonomic Control Plane (LS-ACP) protocol. Network device 300 is similar to ACP network device 200, but provides lightweight security, where lightweight security indicates a less complex system with lower hardware requirements. Hence, network device 300 implementation operates on lower power systems that are less sophisticated. For example, network device 300 provides the best possible security for a particular communication rather than dropping any communications that fail to meet minimum security standards. Further, network device 300 enforces security on communications that are unsecured instead of simply blocking them.

Network device 300 includes a management plane 310 that is substantially similar to management plane 210. For example, management plane 310 may include SNMP 311, DNS 313, Netconf 315, DHCP 317, and/or NTP 319, which may be substantially similar to SNMP 211, DNS 213, Netconf 215, DHCP 217, and/or NTP 219, respectively. Management plane 310 may also include additional applications to operate a network, such as network 100, as desired.

Network device 300 also includes a forced transport shim 340. Certain applications, such as SNMP 311, DNS 313, Netconf 315, and/or DHCP 317 may not natively employ end-to-end encryption. Hence, packets from such applications may be unencrypted when forwarded toward a forwarding plane 330 for communication. The packets from the applications are forwarded through the forced transport shim 340. The forced transport shim 340 is a function that provides encryption for unencrypted packets. For example, the forced transport shim 340 may provide TLS encryption for Transmission Control Protocol (TCP) packets and dTLS encryption for User Datagram Protocol (UDP) packets. The forced transport shim 340 may provide such encryption transparently. In other words, the forced transport shim 340 may provide end-to-end encryption to packets without notifying the corresponding application(s)/service(s)/ASA(s), etc. (e.g., without modifying the binary programming of the source/destination application such as SNMP 311, DNS 313, Netconf 315, DHCP 317, NTP 319). The forced transport shim 340 may unencrypt such packets after communication across the network when the packets are forwarded to a corresponding application at the destination. Further, the forced transport shim 340 may not further encrypt packets that have already been encrypted by the source application. This approach balances security needs without requiring additional system resources to over-encrypt packets that are already sufficiently secure.

Network device 300 also includes a control plane 320 that is similar to control plane 220. Control plane 320 includes a RPL routing 327 function that is substantially similar to the RPL routing 227 function. Control plane 320 also includes an LS-ACP certificate 321 function, an encryption discovery unsolicited link local (NULL) GRASP 325 function, a LS-ACP GRASP 323 function, and/or a RPL routing 327 function, which are similar to the ACP certificate 221 function, the DULL GRASP 225 function, the ACP GRASP 223 function, and/or the RPL routing 227 function respectively, except as described below.

The LS-ACP certificate 321 employs a domain certificate that may be provided via various methods such as Bootstrapping Remote Secure Key Infrastructures (BRSKI). If a device supports LS-ACP, the device's LS-ACP certificate 321 function may employ a certificate domain information field with a key value of LS-ACP to indicate such functionality/compatibility. In other words, the LS-ACP certificate 321 function ensures that authenticated devices operate forced transport shim 340, control plane 320, and forwarding plane 330 and do not operate control plane 220 and forwarding plane 230. This also makes LS-ACP certificates incompatible with ACP certificates 221, and therefore protects an ACP domain from the security impact of connecting to somewhat less secure LS-ACP devices.

The NULL GRASP discovery 325 function is employed to discover other LS-ACP compliant network nodes. The NULL GRASP discovery 325 function may not employ an objective-value when signaling, which indicates supported encryption options in ACP networks. A NULL GRASP discovery 325 function may transmit discovery packets to adjacent nodes. When the NULL GRASP discovery 325 function discovers another LS-ACP neighbor, the NULL GRASP discovery 325 establishes a secure TLS connection with the neighbor node for use in authentication. The NULL GRASP discovery 325 function exchanges the LS-ACP certificate 321 over the TLS connection with the neighbor node, and then authenticates the neighbor nodes based on the received LS-ACP certificate 321. The NULL GRASP discovery 325 function and/or the LS-ACP GRASP 323 function may also employ LS-ACP tagging to send and receive packets with the link-local IPv6 addresses of both nodes over the LS-ACP virtual local area network (VLAN). The TCP port, on which NULL-GRASP TLS is operating, may be statically predefined or negotiated during NULL-GRASP neighbor discovery via a GRASP locator signaling element.

The LS-ACP GRASP 323 function maintains instances of GRASP inside the LS-ACP network, which supports network wide service and objective announcement, discovery, and negotiation. LS-ACP GRASP 323 instances may be created from hop-by-hop TLS, IPsec, and/or dTLS connections between ACP network nodes. For LS-ACP GRASP 323, the LS-ACP certificate 321 is employed for mutual authentication of the TLS connections. A set of LS-ACP GRASP neighbors is a set of neighbors to whom an operational (e.g., authenticated and alive) NULL-GRASP TLS connection exists. LS-ACP GRASP TLS packets may be carried with LS-ACP packet tagging, such as Institute of Electrical and Electronics Engineers (IEEE) 802.1q VLAN tags. The LS-ACP GRASP 323 function monitors the link state of the interface and tears down the TLS connection when the interface goes down at network layer 1 or 2 (e.g., when an Ethernet link is down). This is done to force re-authentication to somewhat reduce the risk of a man-in-the-middle attack. The LS-ACP GRASP 323 function employs frequent aliveness packets across the NULL-GRASP LS-ACP connection to determine that the authenticated LS-ACP neighbor is still reachable across the interface. Hence, disconnection without observable link-status change results in teardown of the NULL-ACP TLS connection.

The RPL routing 327 function employs hop-by-hop Internet Control Message Protocol version 6 (ICMPv6) message encoding for signaling, which is not natively secured. However, RPL routing 327 messages are secure in an ACP network because the RPL signaling packets are carried across the secure hop-by-hop forwarding channels created and maintained by ACP GRASP functions. These channels are not created for RPL exclusively, but carry traffic across the ACP network. For example, these channels carry traffic from management plane 210 services, such as SNMP 211, DNS 213, Netconf 215, DHCP 217, and/or NTP 219. In the LS-ACP, RPL operates over a set of hop-by-hop dTLS connections generated for LS-ACP RPL in the same fashion as TLS connections for LS-ACP-GRASP communications built for RPL. For example, one dTLS connection may be generated to each active NULL-GRASP neighbor for communicating RPL routing 327 packets. The UDP port for these dTLS connections is either pre-determined or dynamically communicated per neighbor from via a NULL-GRASP objective-value parameter. dTLS may be employed because RPL routing 327 packets are Internet Control Message Protocol (ICMP) datagram packets. Link-local IP multicast packets for RPL routing 327 are replicated to all RPL dTLS connections as discussed more fully below. To operate RPL for LS-ACP, the dTLS encapsulation of RPL may employ a shim library that is associated with an ICMP/dTLS encapsulation 322 function and dynamically linked against RPL. The shim library overloads socket functions (e.g., socket, bind, listen, connect, send, receive, etc.) such that ICMP datagram sockets opened by RPL to send/receive RPL signaling packets are automatically encapsulated into dTLS without further knowledge or changes to the RPL routing 327 function. This is possible as there is no need for the RPL routing 327 function to be aware of TLS authentication because such authentication can be automatically performed using the LS-ACP certificate 321.

The control plane 320 also includes an ICMP/dTLS encapsulation 322 function. As noted above, the ACP network employs an RPL routing 327 function to create routing tables. The packets of this routing protocol employ ICMPv6 packet headers and employ link-local IPv6 multicast. The ICMP/dTLS encapsulation 322 function encapsulates these ICMPv6 RPL packets via dTLS. Further, the ICMP/dTLS encapsulation 322 function replicates link-local-scope IPv6 RPL multicast packets into the dTLS connections of the link-local RPL neighbor nodes.

The control plane 320 also includes a traffic counting 329 function. As noted above, LS-ACP data traffic is end-to-end encrypted by the LS-ACP network, but not hop-by-hop encrypted. Accordingly, there is no guarantee that traffic received on an interface actually comes from a NULL-GRASP authenticated LS-ACP neighbor. For example, an attacker could act as a man-in-the-middle by injecting malicious packets to attack devices that are reachable via the LS-ACP. The traffic counting 329 function addresses such man-in-the-middle attacks by allowing both LS-ACP neighbors to compare their sent/received packet counts over a corresponding interface. In other words, a network device may determine a sent packet count and a time stamp. This information may then be forwarded to an LS-ACP neighbor node for comparison with a received packet count over a time period corresponding to the time stamp. The packet count may not be exact due to the time employed by software to retrieve counters from the hardware and the complexity of synchronizing, between neighbors, the point in time when counters are being retrieved. Accordingly, a threshold/margin may be maintained. When a sent packet count is less than a received packet count by an amount greater than the threshold/margin, the LS-ACP node or operator may be alerted to an attack. The node may then alert an application in the management plane 310 to initiate appropriate action (e.g., block packets, tear down a corresponding link, alert an administrator, etc.) By relying on packet and byte counters supported by the hardware of routers and switches, the traffic counting 329 function can address such attacks without creating additional hardware requirements.

Network device 300 also includes a forwarding plane 330 that is similar to forwarding plane 230. The forwarding plane 330 includes an IPv6 VRF forwarding 331 function that is substantially similar to the IPv6 VRF forwarding 231 function. The forwarding plane 330 also includes a tagging 335 function. Instead of secure channel protocols as employed in ACP network device 200, the tagging 335 function employs tags in the LS-ACP traffic, which are carried across LS-ACP interfaces. The tags distinguish LS-ACP traffic from general data-plane traffic. The tags may be statically defined or negotiated by NULL-GRASP in the control plane 320. For example, the tagging 335 function may include VLAN tags. As a specific example, a virtual ACP interface may be formed from secure channels by replicating ACP link-local IPv6 packets into all the secure channels. In such a case, a static VLAN tag may be applied to the packets prior to entering the LS-ACP network. The packets may then be forwarded, by the IPv6 VRF forwarding 331 function, over the VLAN attached to the LS-ACP VRF, and hence securely routed over the corresponding TLS/dTLS connections. However, whenever no corresponding NULL-GRASP TLS connection is operational, the IPv6 VRF forwarding 331 function may block data packets from/to the LS-ACP VRF on the interface. In such a case, no LS-ACP tagged packets are expected/allowed for the LS-ACP TLS. LSP-ACP TLS packets are TCP packets with the local node link-local IPv6 address and the static TCP port number or the port number dynamically chosen and GRASP signaled by the local node and the remote node. Blocking LS-ACP traffic this way establishes a lightweight security mechanism to protect injection of traffic unless an authenticated neighbor is present on the link.

The network device 300 addresses several problems with ACP network device 200. Namely, that actual deployments of an ACP network may be unable to support the hop-by-hop encryption of ACP data packets via secure channel protocols such as IPsec or dTLS due to improper system configuration and/or hardware limitations or unacceptable cost. This is due to the fact that links in the ACP network may transfer a large amount of ACP traffic between many remote ACP nodes, which may require hardware/microcode acceleration of encryption to support such performance. Many network devices (e.g., routers/switches) do not have such hardware encryption support. To avoid hop-by-hop encryption, the LS-ASP network device 300 employs several components that result in complete end-to-end encryption of all traffic across the LS-ACP network. When employing such end-to-end encryption using dTLS and TLS, only the application that generates the traffic may perform the encryption. In such a case, the encryption may only be performed at a performance level set for such application, which may allow the encryption to be performed by the same CPU that executes the application. To avoid having to explicitly modify such applications and components of the ACP, the mechanisms perform end-to-end encryption, as needed, automatically and unbeknownst to the application.

In summary, network device 300 employs NULL GRASP discovery 325, LS-ACP certificate 321, and LS-ACP GRASP 323 to authenticate neighbor nodes and create and/or maintain secure TLS/dTLS connections with such neighbors. The forced transport shim 340 then transparently encrypts packets from applications when such packets are not already encrypted. The encrypted packets are then tagged and forwarded across such secure connections. This ensures packets are end-to-end encrypted and that the LS-ACP network is secure. Traffic counting 329 assists in securing the LS-ACP network for malicious packets. As such, network device 300 provides a lightweight security scheme that provides security for devices without requiring significant hardware resources. Further, the network device 300 provides security when possible, while forwarding packets through the general network when no secure path is available. The following FIGS. discuss particular deployments of networks and/or corresponding network devices such as network device 300 that implement the functionality discussed hereinabove.

Figure 4:
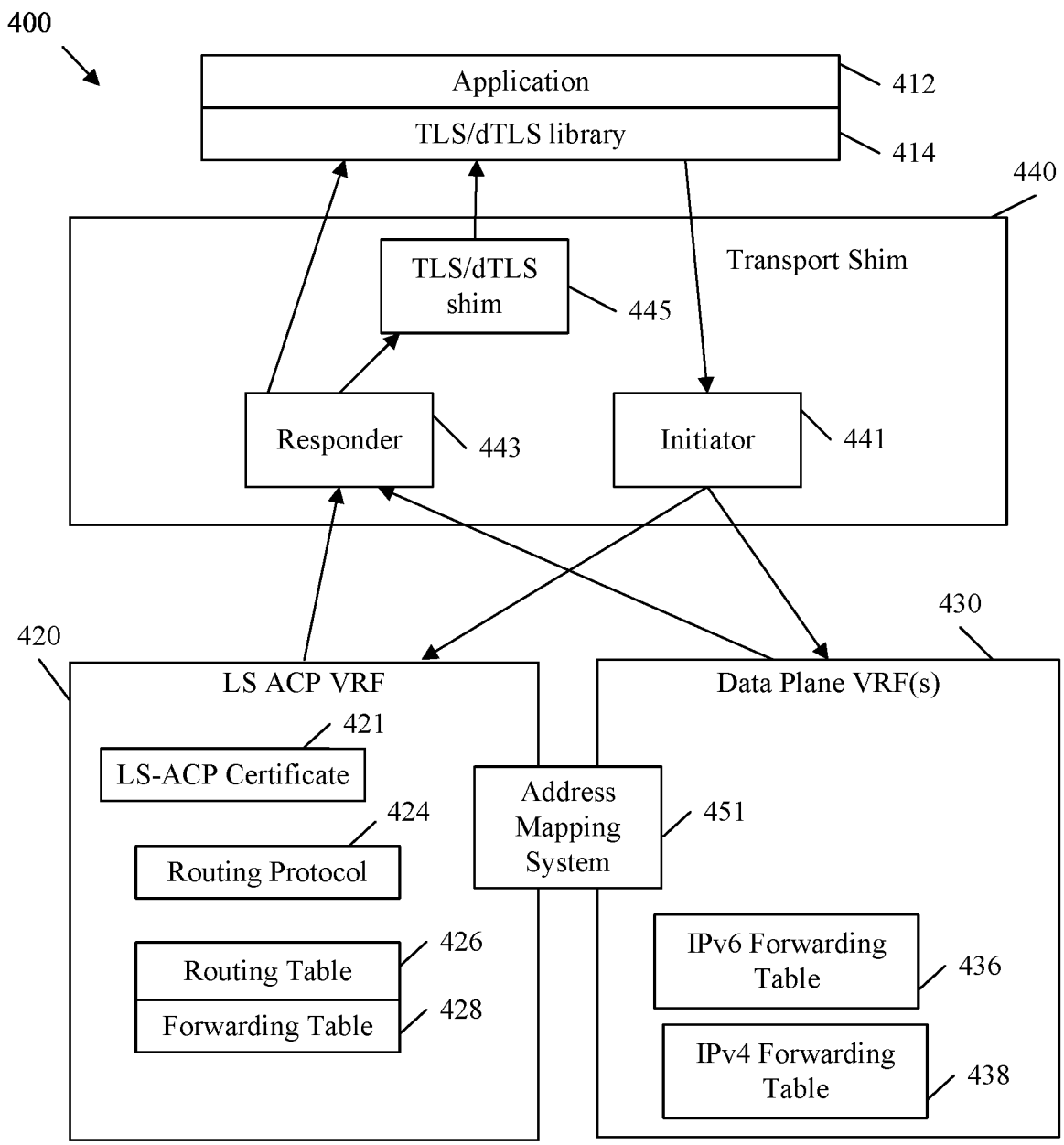
FIG. 4 is a schematic diagram of an example implementation of a LS-ACP network.

FIG. 4 is a schematic diagram of an example implementation of a LS-ACP network 400. Network 400 may operate on a network 100 and implement the functionality of a network device 300. Network 400 includes one or more applications 412 that may be similar to the applications of management plane 310. Some applications 412 may have access to a TLS/dTLS library 414. The TLS/dTLS library 414 may contain information to support application level communication encryption. For example, the TLS/dTLS library 414 may be an Open source Secure Socket Layer (OpenSSL) library. The applications 412 that have access to the TLS/dTLS library 414 may generate packets and employ to the TLS/dTLS library 414 to encrypt the generated packets. Other applications 412 may generate unencrypted packets for transport across the network 400. Both encrypted and unencrypted packets are forwarded toward a data plane VRF 430 for communication across the network 400. However, such packets are forwarded through a transport shim 440.

The transport shim 440 is employed to implement a forced transport shim 340. The transport shim 440 includes an initiator 441, a responder 443, and a TLS/dTLS shim 445. The initiator 441 is employed by a network device that is prepared to communicate a packet (e.g., the transmitter), while the responder 443 and the TLS/dTLS shim 445 are employed by a network device that acts as a destination for the communication (e.g., a correspondent node). The initiator 441 is a function configured to initiate a communication from a source application 412. The initiator 441 examines the packet from the application 412 to determine the destination VRF for the packet. When the packet is already directed to a specific local VRF, the local LS-ACP VRF 420 and/or a local data plane VRF 430 is employed to forward the packet to an equivalent VRF at the destination node. When the packet is directed to a default VRF, the initiator 411 redirects the packet to the proper local ACP VRF, which can then direct the packet to a corresponding VRF at the destination node. First, the initiator 441 determines whether the destination network address is reachable via the LS-ACP network 400. When the destination is not reachable, the packet can be forwarded through the general network without additional security. When the destination is reachable, the initiator 441 can direct the local LS-ACP VRF 420 to initiate a communication with a corresponding VRF at the destination node. Further, the initiator 441 examines the packet to determine if the packet is already encrypted. If the packet has been encrypted by the source application 412, then the packet can be communicated as encrypted. Otherwise, the initiator 441 can direct the LS-ACP VRF 420 to end-to-end encrypt the packet before transmission.

The LS-ACP network 400 also includes LS-ACP VRF 420, which implements the functionality of control plane 320 and forwarding plane 330. Specifically, multiple LS-ACP VRFs 420 operate on a plurality of physical nodes in the network 400. An LS-ACP VRF 420 includes an LS-ACP certificate 421 function, which is substantially similar to LS-ACP certificate 321 function. Accordingly, the LS-ACP certificate 421 function, along with NULL GRASP discovery functions, allow any network device/node operating an LS-ACP VRF 420 to establish a secure connection with one or more neighbor network nodes, which also operate separate LS-ACP VRFs 420, as part of the LS-ACP network 400. Such communication may occur via a transmitter and/or a receiver, and may occur when the corresponding device starts up in the network. The LS-ACP network 400 becomes operational when a plurality of nodes authenticate each other via this process. Such a secure connection may be established via multicast link-local communication connections with adjacent network nodes in some cases.

Once the relevant network devices are authenticated, the LS-ACP VRF 420 may receive a request from a source application 412 to initiate a connection with a remote network node. In other words, the LS-ACP VRF 420 receives the packet for transmission toward the remote network node as processed by the transport shim 440 via initiator 441.

The LS-ACP VRF 420 employs a routing protocol 424, a routing table 426, and/or a forwarding table 428, depending on the example. The routing protocol 424 may be any routing protocol for communicating packets over an LS-ACP network, such as a RPL routing 327 function. The routing table 426 is an LS-ACP routing table, and may be populated with VRF addresses of network nodes in the LS-ACP network and/or corresponding physical network addresses (e.g., IPv6 network addresses) for such nodes. The forwarding table 428 is an LS-ACP forwarding table, and may be populated with VRF addresses of network nodes in the LS-ACP network as well as port forwarding information indicating which physical port can direct a message to the network node associated with the corresponding VRF address. The routing table 426 and the forwarding table 428 may be populated according to several mechanisms, depending on the desired implementation. In some implementations, the routing protocol 424 employed on the nodes in the LS-ACP network may flood the VRF addresses of network nodes and corresponding physical addresses across the LS-ACP network (e.g., over secure connections to all authenticated LS-ACP network nodes). In such a case, the routing table 426 and the forwarding table 428 may be populated based on such flooded information. In other cases, the routing table 426 and the forwarding table 428 may be populated by an address mapping system 451. The address mapping system 451 may operate on a separate node and maintain a database containing the physical addresses and VRF addresses of all authenticated nodes in the LS-ACP network (e.g., the address mapping system 451 may be informed via signaling when a new node is authenticated into the LS-ACP network). When an address mapping system 451 is employed, the LS-ACP network may not flood VRF addresses. Instead, a node can request a VRF of a destination node from the address mapping system 451 upon receiving a packet from a source application 412 for transport.

Packet forwarding is managed according to an LS-ACP forwarding table 428 and/or a data plane VRF 430. A data plane VRF 430 contains an IPv6 forwarding table 436 and/or an IPv4 forwarding table 438 containing addresses to support forwarding packets across a network. The routing protocol 424 and routing table 426 are employed as a mechanism to create entries in the address mapping system 451. In other words, the address mapping system 451 is employed to forward local node LS-ACP and data plane addresses to the routing protocol 424. The routing protocol 424 can then distribute such information to other nodes operating instances of routing protocol 424 in the network. Each routing protocol 424 stores such information in the corresponding routing table 426. Accordingly, when an initiator 441 requests a VRF address from the address mapping system 451, the address mapping system 451 can obtain such information from the routing table 426. The VRF can then be appended to the packet, as desired, and the packet can be forwarded by the LS-ACP forwarding table 428 and/or a data plane VRF 430 toward the destination node.

FIG. 4 is discussed above in terms of the functionality of a network device acting as a packet source. FIG. 4 is discussed in terms of packet destination functionality below. Specifically, a data plane VRF 430 at the destination node receives the packet and forwards the packet towards the transport shim 440 for delivery to an application 412 operating on the destination network node. The packet is received by a responder 443 in the transport shim. The responder 443 is a function that listens to a corresponding socket for communication activity. When a packet is received, the responder 443 determines whether the destination application 412 is employing encryption. When the destination application 412 is employing encryption, the responder 443 forwards the packet directly to the destination application 412 for decryption. When the destination application 412 is not employing encryption, the responder 443 forwards the packet toward the destination application 412 via a TLS/dTLS shim 445 library. The TLS/dTLS shim 445 is a library employed for transparent encryption/decryption. The TLS/dTLS shim 445 at the destination node is configured to decrypt the packet prior to forwarding the packet toward the destination application 412. In this way, the packet is end-to-end encrypted by the transport shim 440 in a manner that is transparent to the application 412. However, if the application 412 employs end-to-end encryption, such encryption is employed during transport without burdening the system with additional encryption.

It should be noted that the design of network 400 achieves several goals. For example, network 400 ensures applications automatically select the LS-ACP VRF 420 for their traffic if the destination node is reachable across the LS-ACP VRF 420. Further, network 400 ensures end-to-end encryption for application traffic is automatically selected when such application employ a LS-ACP VRF 420. Further, legacy applications 412 may be used to operate according to network 400. Such legacy equipment may operate network applications across the LS-ACP network with or without application layer end-to-end transport layer security. The disclosed mechanism can support applications that initiate and respond to transport layer connections via one or more VRFs. For example, some legacy applications cannot explicitly select which VRF to use for a connection, and can only connect via a default VRF. These applications are referred to as non-VRF aware. These applications can nevertheless respond to connections received from different VRFs. Accordingly, a non-VRF aware application can receive connections from the LS-ACP VRF, but cannot initiate connections across the LS-ACP VRF. Network 400 provides such capabilities to non-VRF aware applications. In other cases, an application may be VRF aware and can select which VRF to employ for initiated transport connection. However, selecting the LS-ACP VRF for initiated connections may only be accomplished upon operator configuration, which may not occur in some cases. VRF aware applications may include a default VRF that is employed whenever the operator has not configured a specific VRF for a connection. The LS-ACP should not be made the default VRF in most cases because not all devices reachable via the default VRF are also reachable via the LS-ACP VRF. As such, network 400 allows non-VRF aware applications to automatically use the LS-ACP, and allows VRF aware applications to use the LS-ACP without requiring operators to explicitly provide configuration (e.g., allowing the operator to employ a default VRF).

It should also be noted that various applications may or may not employ end-to-end encryption. If an applications does support end-to-end encryption, configuration of the application may require explicit configuration of keying material and selection of which keying material to employ to each peer. Network 400 allows applications without support for end-to-end encryption to employ the LS-ACP network. Further, network 400 allows applications supporting end-to-end encryption to employ the LS-ACP network even when such applications have not been configured to properly employ the end-to-end encryption. This allows such applications to rely on the automatically provided end-to-end encryption from the LS-ACP transport layer shim.

As noted above, automatic selection of the LS-ACP is performed by the transport shim 440 when an application 412 initiates a connection without indicating a VRF. This may occur because the application 412 is VRF unaware or is VRF aware and employing the default VRF. As a responder 443, the VRF is selected by remembering the incoming VRF of packets and employing the same VRF for return packets of the same connection. In one mechanism, the initiator 441 determines whether to use a LS-ACP connection by examining the address of the responder 443 indicated by the application 412. If the address is of type IPv6, the transport shim 440/initiator 441 examines the routing table 426 of the LS-ACP VRF 420 to determine if that address is reachable. If the address is reachable then the connection is established across the LS-ACP, but no connection is established in any other case. When this mechanism is employed, initiators 441 should indicate addresses for the responders 443 that are reachable via the LS-ACP VRF 420. In a second mechanism, initiators 441 can indicate the address of responders 443 as a default VRF. An Address Mapping System 451 is employed to permit the initiator 441 to determine the responder's 443 LS-ACP VRF address even though the application 412 only indicates the responder's 443 address in the default VRF. In a particular example, the address mapping service 451 operating on the responder 443 injects the responder's 443 default VRF address into the LS-ACP routing protocol 424 as additional information so that the responder's 443 VRF address is included in the initiators 441 routing table 426 and is associated with the route for the responders 443 LS-ACP address. It should be noted that, in an ACP network, a routing table 426 may maintain a separate routing entry for every ACP device's address prefix. Because the responder 443 VRF address is considered associated information, the routing table 426 does not install this information as an additional route into the forwarding table 428 and therefore does not increase the demand on forwarding tables 428 and/or memory. Instead, the information is only made available in the routing table 426 of the LS-ACP nodes.

Further, whenever the initiator determines the reachability of the responder address, the initiator communicates with the routing protocol 424, which consults the routing table 426. If the responder 443 address is found as additional information of a routing entry, the base address of that routing entry is returned. The initiator 441 then changes the responder 443 address to that address and uses the LS-ACP VRF 420 for the connection. Otherwise the initiator 441 keeps the responder 443 address unchanged and employs the default VRF. In a second mechanism, the address mapping system 451 does not flood the mapping of default VRF to LS-ACP address via the routing protocol 424, but instead uses a lookup mechanism that employs an active lookup whenever an initiator 441 decides to determine the reachability of a responder's 443 address. This second mechanism may be beneficial when a responder's 443 addresses is rarely looked up, which would render flooding of the mapping computationally expensive for the needs of the system.

To provide a request & reply based the address mapping system 451, GRASP can be employed. The default VRF address may be encoded as an objective name. In such a case, the address mapping system 451 may send a GRASP message discovery (M_DISCOVERY) message which is flooded across the LS-ACP network. The responder 443 whose default VRF is indicated in the M_DISCOVERY message responds with a GRASP multiple response (M_RESPOND) delivering the responder's 443 LS-ACP address. The initiator 441 may then employ the LS-ACP network for the connection by replacing the responder's 443 physical address with the learned LS-ACP responder 443 VRF address. Otherwise the initiator 441 may employ the default VRF and leave the responder's 443 address unchanged. The LS-ACP network 400 causes all application traffic across LS-ACP to be end-to-end encrypted. To make this invisible to the applications 412, the TLS/dTLS shim 445 library is employed to overload the functionality of the socket application programming interface (API) to automatically encrypt traffic for TCP sockets with TLS and traffic for UDP traffic with dTLS. Further, authentication employs the LS-ACP certificate 421.

Figure 5:
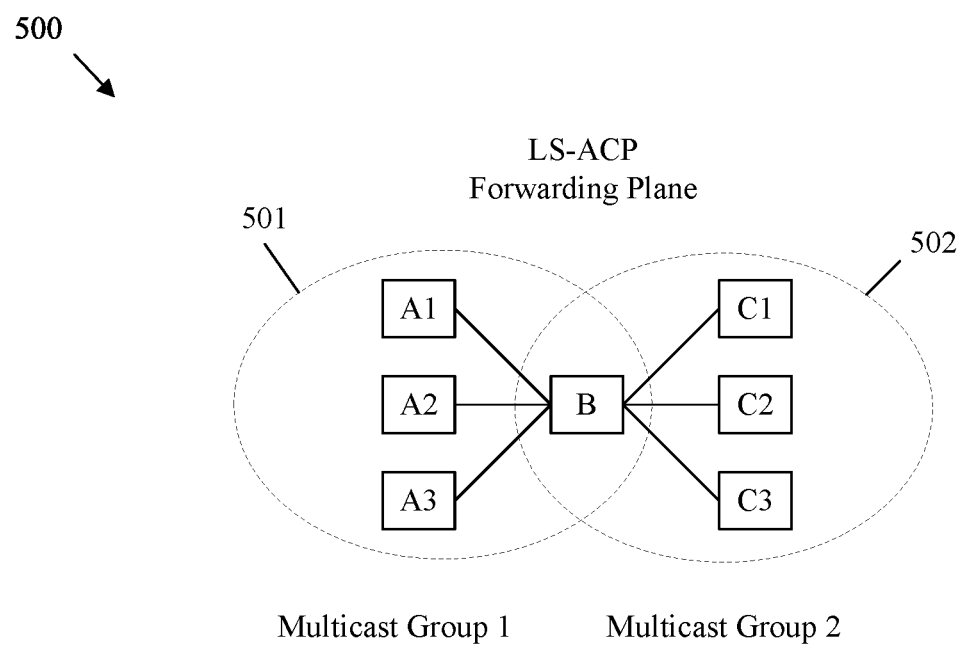
FIG. 5 is a schematic diagram of an example forwarding plane implementation in a LS-ACP network.

FIG. 5 is a schematic diagram of an example forwarding plane 500 implementation in a LS-ACP network. For example, forwarding plane 500 may be employed as a subset of a forwarding plane 130, 330, and/or 430. Forwarding plane 500 depicts a particular situation in a LS-ACP network. Specifically, an application may forward unencrypted multicast packets (e.g., link local multicast packets). In such a case, a single packet is forwarded from the application with the intent that multiple copies of such packet be sent to multiple destinations. This may be referred to as point to multi-point (P2MP) communication. This may also occur as a part of a multi-point to multi-point (MP2MP) scenario.

Forwarding plane 500 contains a plurality of nodes labeled A1-A3, B, and C1-C3. Node B is depicted as the source of a multicast communication. Nodes A1-A3 are a group of receivers for a first multicast group 501, and nodes C1-C3 are a group of receivers for a second multicast group 502. For example, a LS-ACP VRF operating on node B may receive an unencrypted multicast packet for communication to the first multicast group 501 via a LS-ACP routing protocol. In such a case, the LS-ACP VRF should prepare to end-to-end encrypt each copy of the multi-casted packet. In order to complete such an operation, the LS-ACP VRF converts the group of unencrypted packets for the first multicast group 501 into a list of unicast packets directed to the receivers of the first multicast group 501 (e.g., nodes A1-A3). The unicast packets are then encrypted according to a corresponding encryption protocol, such as TLS, DTLS, etc. The unicast packets are then forwarded to the data plane VRF at node B for communication to nodes A1-A3. The data plane VRF then tags the unicast packets and transmits the encrypted unicast packets as link-local unicast to the neighboring network nodes A1-A3. Likewise, the source node B may receive a packet for transmission across the second multicast group 502. In a similar manner, the LS-ACP VRF multicasts the packets by creating a plurality of secure end-to-end connections with the adjacent network nodes C1-C3. The LS-ACP VRF and/or data plane VRF then encrypt the packets and employ unicasting to transmit the encrypted packets over the secure end-to-end connections to nodes C1-C3 of the second multicast group 502.

Figure 6:
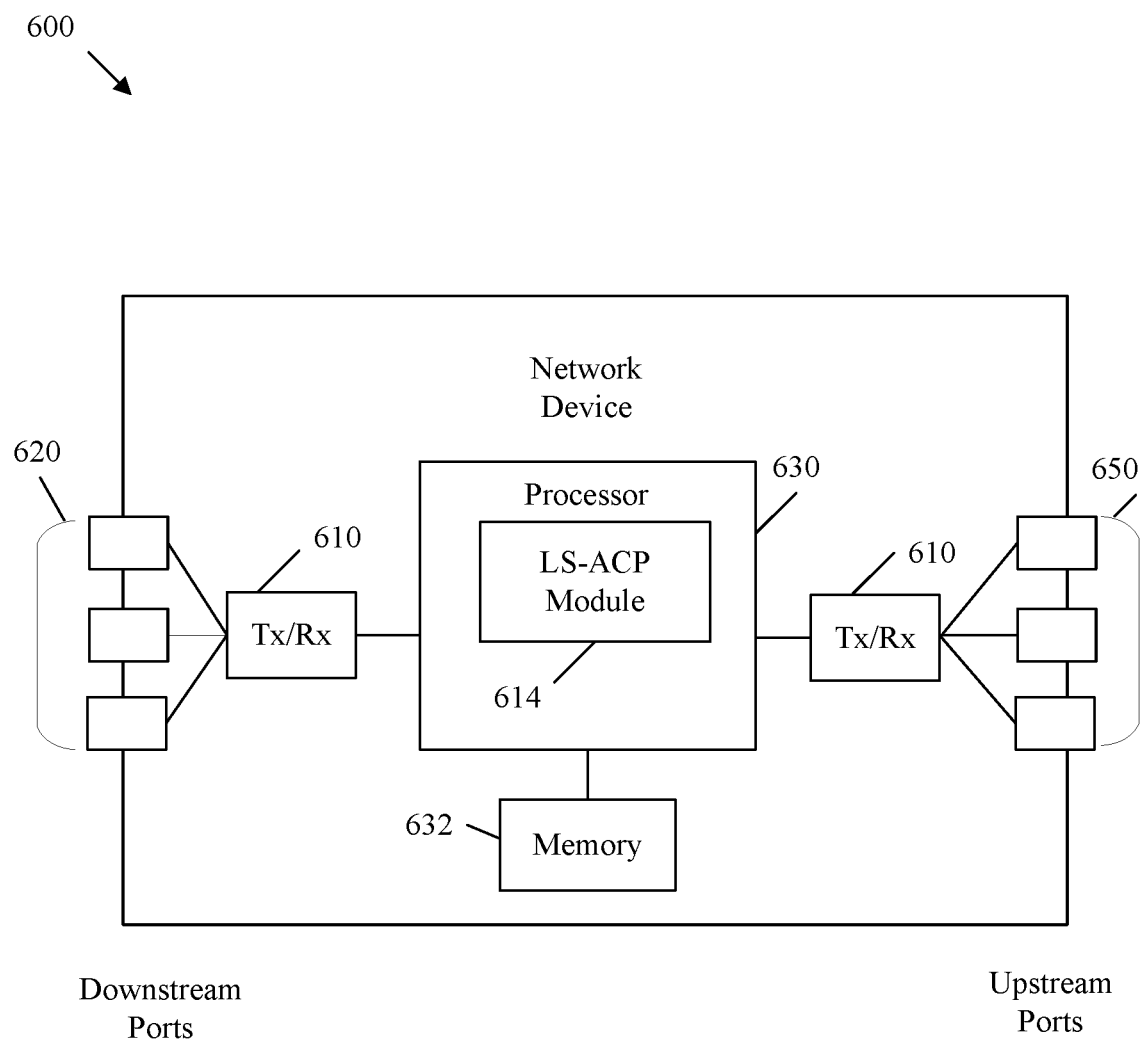
FIG. 6 is a schematic diagram of an example network device for operation in a LS-ACP network.

FIG. 6 is a schematic diagram of an example network device 600 for operation in a LS-ACP network, such as network node/device in network 100, 300, 400, and/or forwarding plane 500. Network device 600 may be any device that transmits packets over an LS-ACP network. Hence, the network device 600 may operate an application, a transport shim, an LS-ACP VRF, and/or a data plane VRF, as discussed above. Accordingly, the network device 600 may be configured to implement or support any of the schemes/features/methods described herein. One skilled in the art will recognize that the term network device encompasses a broad range of devices of which network device 600 is merely an example. Network device 600 is included for purposes of clarity of discussion, but is in no way meant to limit the application of the present disclosure to a particular network device embodiment or class of network device embodiments. At least some of the features/methods described in the disclosure may be implemented in a network apparatus or component such as a network device 600. For instance, the features/methods in the disclosure may be implemented using hardware, firmware, and/or software installed to run on hardware. The network device 600 may be any device that transports electrical and/or optical signals through a network, e.g., a switch, router, bridge, server, a client, etc. As shown in FIG. 6, the network device 600 may comprise transceivers (Tx/Rx) 610, which may be transmitters, receivers, or combinations thereof. A Tx/Rx 610 may be coupled to a plurality of downstream ports 620 (e.g., downstream interfaces) for transmitting and/or receiving frames from other nodes and a Tx/Rx 610 coupled to a plurality of upstream ports 650 (e.g., upstream interfaces) for transmitting and/or receiving frames from other nodes, respectively. A processor 630 may be coupled to the Tx/Rxs 610 to process the data signals and/or determine which nodes to send data signals to. The processor 630 may comprise one or more multi-core processors and/or memory devices 632, which may function as data stores, buffers, etc. Processor 630 may be implemented as a general processor or may be part of one or more application specific integrated circuits (ASICs) and/or digital signal processors (DSPs). The network device 600 may comprise a LS-ACP module 614, which may be configured to operate a transport shim, a LS-ACP VRF, a data plane VRF, and/or any associated components. Accordingly, the LS-ACP module 614 may establish secure connections with LS-ACP modules in other nodes by employing NULL GRASP. The LS-ACP module 614 may also receive unencrypted packets from an application and end-to-end encrypt such packets before transporting them to other nodes via Tx/Rx 610 over an LS-ACP network. The LS-ACP module 614 may be implemented as a general purpose processor, a field programmable gate array (FPGA), an Application Specific Integrated Circuit (ASIC), a Digital Signal Processor (DSP), a microcontroller, etc. In alternative embodiments, the LS-ACP module 614 may be implemented in processor 630, as instructions stored in memory device 632 (e.g., as a computer program product), which may be executed by processor 630, and/or implemented in part in the processor 630 and in part in the memory device 632. The downstream ports 620 and/or upstream ports 650 may contain electrical and/or optical transmitting and/or receiving components.

Figure 7:
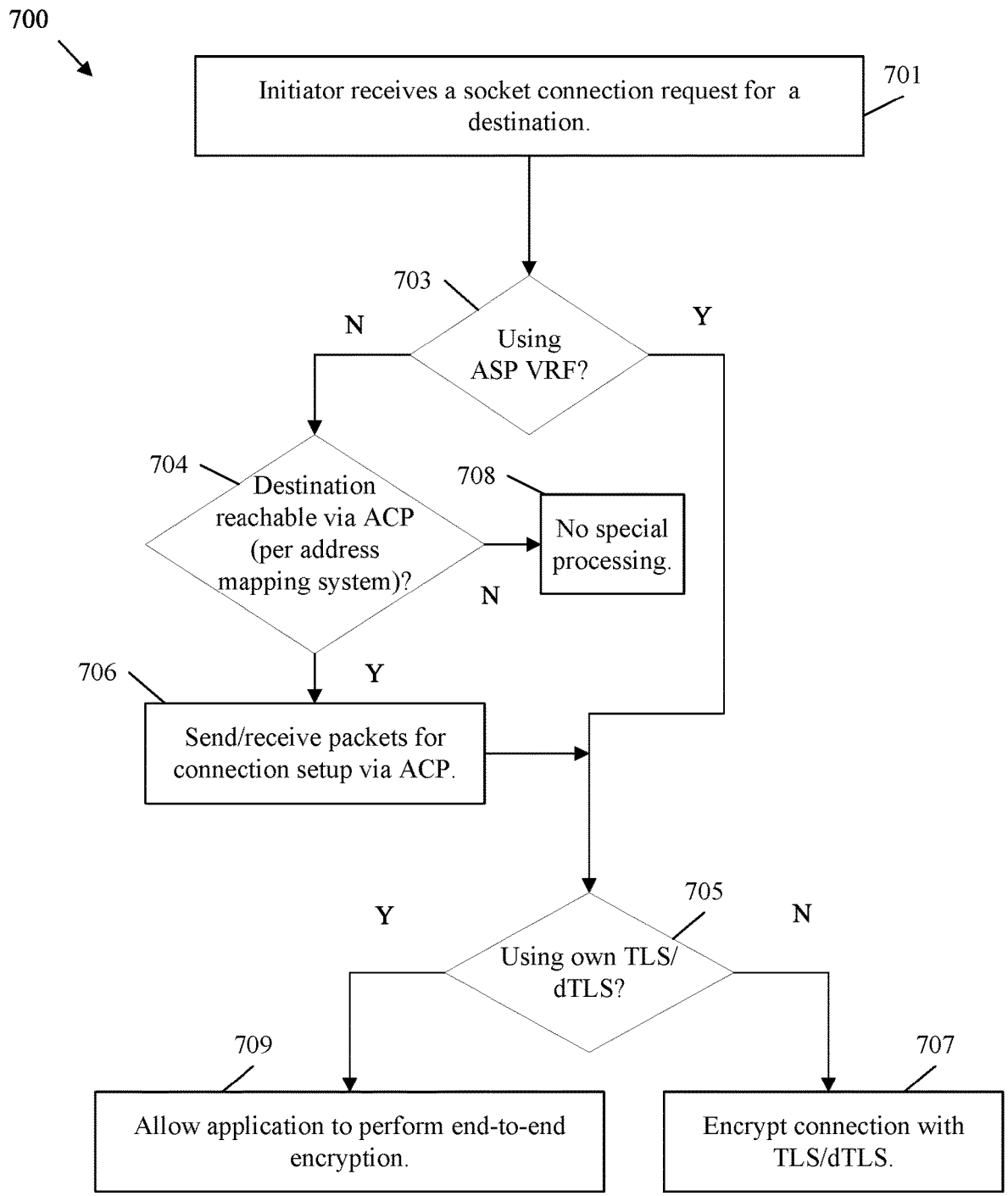
FIG. 7 is a flowchart of an example method for operating a transport shim initiator.

FIG. 7 is a flowchart of an example method 700 for operating a transport shim initiator, such as initiator 411 in a network 100, 300, 400, forwarding plane 500, and/or in a network device 600. The initiator employs method 700 to perform auto-selection of a destination node ACP VRF and automatic encryption that is transparent to the application layer. Specifically, method 700 allows the transport shim initiator to select when to perform encryption, such as TLS and/or dTLS.

At block 701, the initiator receives a socket connection request for a destination. Specifically, the initiator in the transport shim receives the connection request from an application, which may operate in a network management plane. The connection request may indicate the destination node in terms of a physical network address (e.g., an IP and/or Media Access Control (MAC) address) or an VRF address in the LS-ACP network. At block 703, the initiator determines whether the request is directed to an ASP VRF or is employing a physical address. When the request is already directed to an ASP VRF, the method 700 proceeds to block 705, which is discussed below. When the request is not directed to an ASP VRF, the method 700 proceeds to block 704 to automatically select an ASP VRF address if such is available.

At block 704, the method 700 determines whether the destination is reachable via the ACP network. For example, the initiator may communicate with the routing protocol and/or the routing/forwarding table to determine the destination VRF address and a route/port toward the destination node via the LS-ACP network. As another example, the initiator may communicate with the address mapping system to determine the VRF address and network route/port to the destination node. When the destination node is not reachable via the ACP, either because no route exists or because the destination node is not LS-ACP compliant, the method 700 proceeds to block 708 and performs no special processing. In other words, the packet is sent to the destination node across the network without employing the LS-ACP and any corresponding security. When the destination node is reachable via the LS-ACP network, the method 700 proceeds to block 706. At block 706, connection setup packets are exchanged (e.g., sent and/or received by the routing protocol function) with the destination node via the LS-ACP network. This results in setting up a secure connection between the source node and the destination node across the LS-ACP for further communication. The method 700 then proceeds to block 705.

At block 705, the method 700 determines whether the application has already performed encryption on the packet, such as TLS and/or dTLS. When the application is not using an encryption, the method 700 proceeds to block 707 and end-to-end encrypts the packets transmitted over the connection, for example by employing TLS and/or dTLS. When the application has already end-to-end encrypted the packets, the method 700 proceeds to block 709 and allows the application to perform the end-to-end encryption when transmitting the packets. Hence, the source node performs no additional encryption when the packets from the application are already encrypted by the application.

Method 700 allows the transport shim to forgo intercepting connections and performing transparent encryption for applications that are known to already use sufficient end-to-end encryption (for example via a TLS/dTLS library like OpenSSL). This may be achieved through configuration or by recognizing that the application links against the encryption library. It should be noted that applications that are not aware of different VRFs in network devices can often accept connections from multiple VRFs. Method 700 ensures the transport shim will only perform encryption if the connection is between LS-ACP VRFs, and hence between two LS-ACP compliant nodes. This allows the system to provide the best possible security depending on the constraints of the devices involved.

Figure 8:
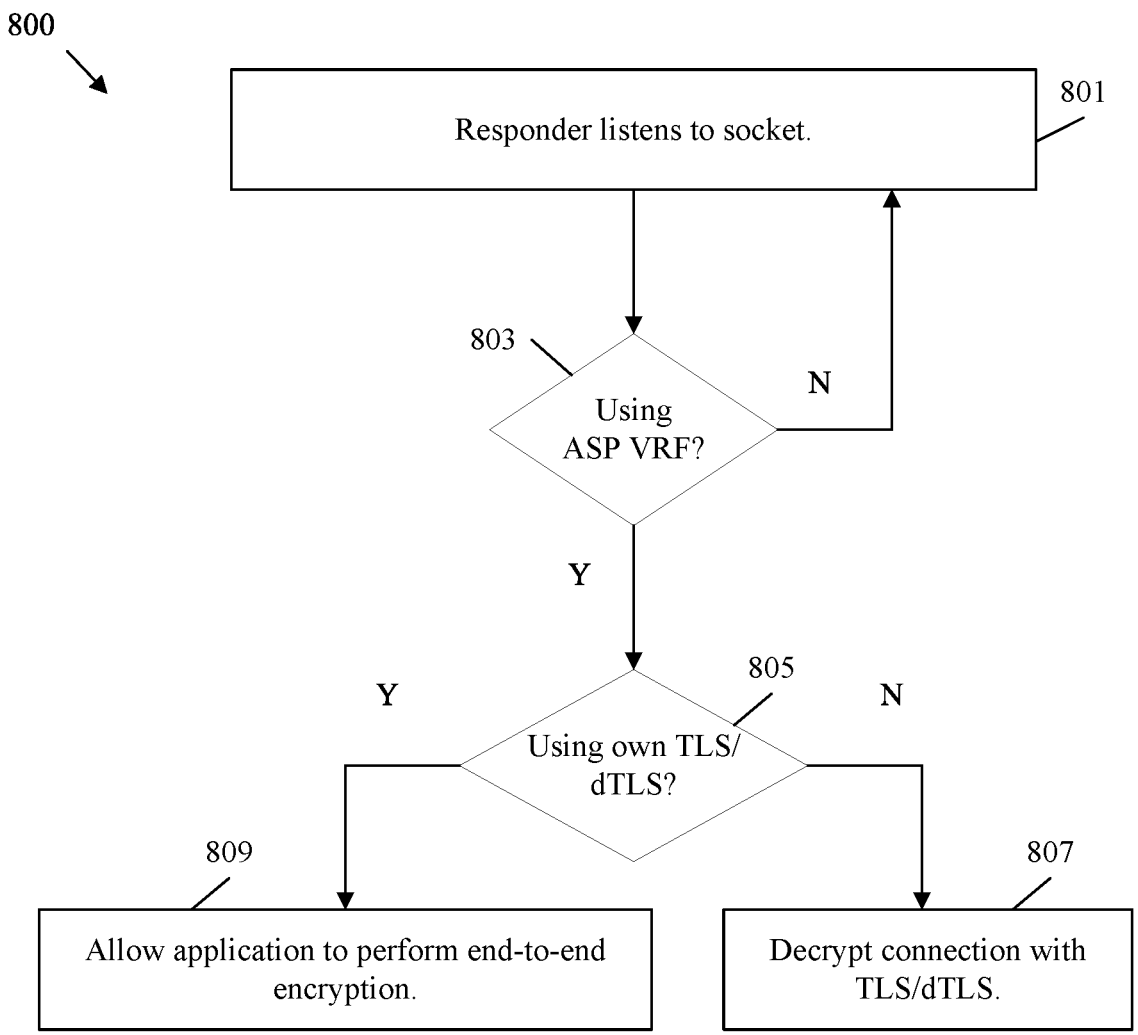
FIG. 8 is a flowchart of an example method for operating a transport shim responder.

FIG. 8 is a flowchart of an example method 800 for operating a transport shim responder, such as responder 443 in a network 100, 300, 400, forwarding plane 500, and/or in a network device 600. The responder operates on a destination node and employs method 800 to respond to communications with an initiator at a source node employing method 700.

At block 801, the responder listens to a socket for communications over the LS-ACP network. When a packet is received, the method 800 proceeds to block 803. At block 803, the responder determines whether the received packet is from an LS-ACP VRF, for example by determining whether the packet source and/or destination is directed to a VRF address or a physical network address. If the packet is not from an LS-ACP VRF, the packet is improperly trying to access the LS-ACP network and is dropped. In such a case, the method 800 returns to block 801. When the message is from an LS-ACP VRF, the method 800 proceeds to block 805.

At block 805, the responder determines whether the packet is encrypted by an application or is transparently encrypted by the transport shim at the source. As with method 700, this may be accomplished based on configuration and/or based on recognition of the source application. When the packet has been encrypted by the application, the application is allowed to perform end-to-end encryption at block 809. In other words, the responder may forward the packet to an application at the destination node without decrypting the packet. This allows the destination node application to manage the decryption. When the packet has not been encrypted by the application, the decryption library in the transport shim is employed to decrypt the packet/connection (e.g., by employing TLS and/or dTLS) at block 807. In such a case, the transport shim decrypts the packet and forwards the packet to the application. This allows the encryption/decryption to be managed transparently by the transport shim without the application at the source or the destination being involved in securing the connection.

Figure 9:
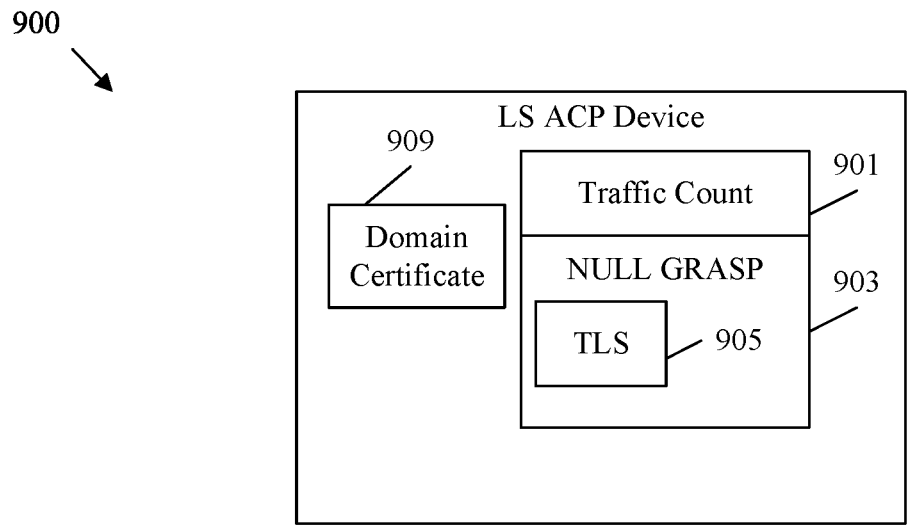
FIG. 9 is a schematic diagram of an example LS-ACP device for performing traffic comparison.

FIG. 9 is a schematic diagram of an example LS-ACP device 900 for performing traffic comparison. The LS-ACP device 900 may operate as a source, a destination, and/or any node between the source or the destination in a network 100, 300, 400, and/or forwarding plane 500. The functionality of LS-ACP device 900 may be implemented in the control and/or forwarding plane of a corresponding node (e.g., which may further operate the functionality discussed above in a transport shim, a management plane, etc.) As noted above, the LS-ACP network employs end-to-end encryption. Without hop-by-hop encryption, man-in-the-middle attackers may inject, modify, and/or remove packets between mutually authenticated LS-ACP neighbors. LS-ACP device 900 employs a mechanism that can be locally implemented on a network platform. It should be noted that the accuracy of discovery of malicious activity depends on the accuracy of the hardware. The traffic comparison mechanism disclosed may be limited to LS-ACP neighborships across a point-to-point link. If instead more than two mutually authenticated LS-ACP neighbors connect to each other via a multi-point Ethernet, the mechanism may not directly apply.

The LS-ACP device 900 employs a domain certificate function 909, which may be substantially similar to a LS-ACP certificate 421. The LS-ACP device 900 also employs a NULL GRASP 903 function to maintain authentication with neighboring node(s) and a TLS 905 function to secure communications, in a manner similar to LS-ACP GRASP 323 function and ICMP/dTLS encapsulation 322 function, respectively. The LS-ACP device 900 also employs a traffic count 901 function. Traffic count 901 maintains a counter of packets sent over each port and packets received over each port. Specifically, traffic count 901, tracks communications over a point-to-point link between LS-ACP neighbors and maintains a sent bytes counter, a sent packets counter, a received bytes counter, and/or a received packet counter. Traffic count 901 also maintains a clock to measure intervals and perform operations at specific intervals. Accordingly, LS-ACP device 900 is configured to compare the sent packet/bytes of the sending side of the link with the received packets/bytes on the receiving side of the link. Depending on the accuracy of the counter retrieval and determination of the interval, the accuracy of comparing the counters varies. An example device may employ one microsecond accurate time intervals and counter retrieval. Within a one microsecond interval, only one 1500 byte packet may be in transit on a 100 Gigabits per second (Gbps) link. Even a single change to total packet/bytes by a man-in-the-middle attacker during a thirty second interval could be detected. Many deployed links are slower than the previous example, and hence even less accuracy is required. Further, attackers would need to create more packet changes (e.g., inject more packets) than the detection threshold to maintain a problematic attack.

Accordingly, traffic count 901 maintains and exchanges counters with neighbor nodes via a NULL GRASP 903 connection secured by TLS 905. To ensure that the exchange over LS-ACP network is as fast as possible, the NULL GRASP ACP traffic may be sent/enqueued with a highest priority over an interface, which ensures such packets are not delayed by other competing packets. LS-ACP device 900 may employ method 1000 below to perform traffic comparison and detect man-in-the-middle attackers.

Figure 10:
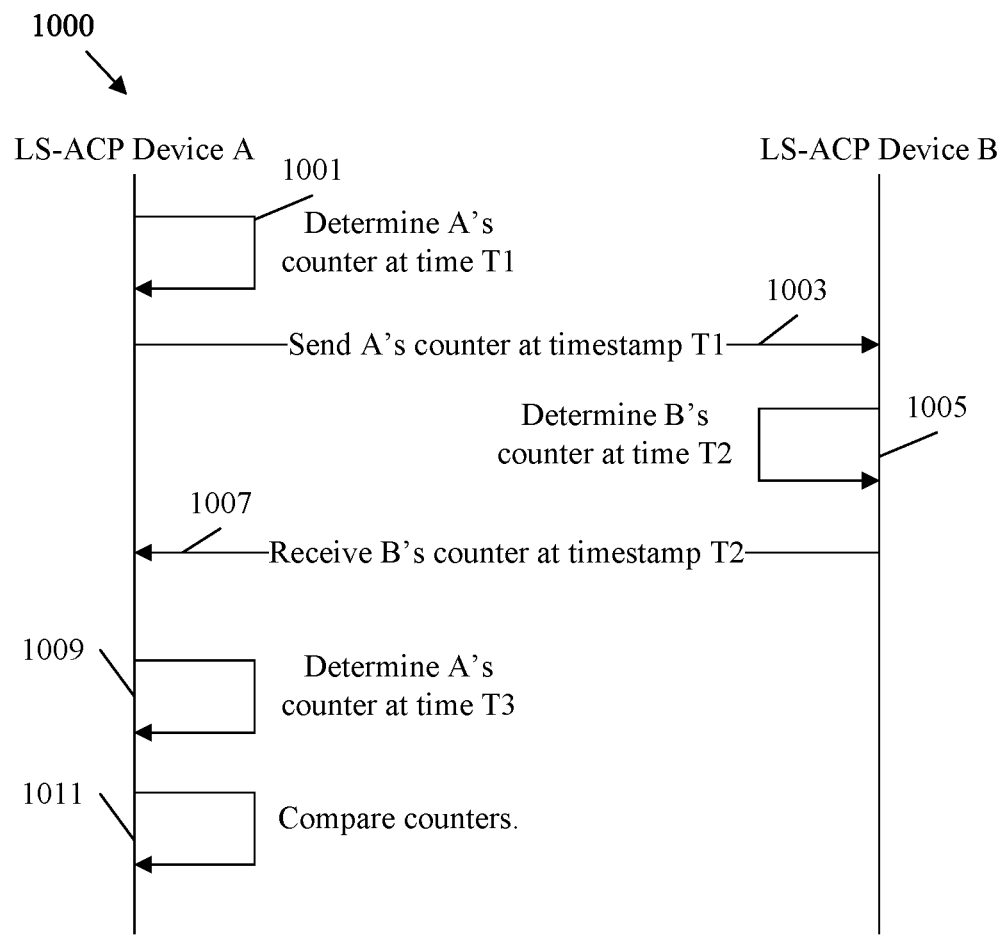
FIG. 10 is a flowchart of an example method of performing traffic comparison.

FIG. 10 is a flowchart of an example method 1000 of performing traffic comparison, for example by a LS-ACP device 900 in any network discussed above. Specifically, method 1000 allows adjacent network devices to protect a secure connection against man-in-the-middle attacks. Method 1000 operates between a pair of LS-ASP devices, denoted here as LS-ACP device A and LS-ACP Device B, connected over an LS-ACP point-to-point link.

At block 1001, device A determines device A's counters for sent and/or received bytes and/or packets across the link to device B at a first time, denoted as T1. At block 1003, device A sends device A's counters, as determined at block 1001, and a timestamp for T1 to device B. At block 1005, device B determines device B's counters for sent and/or received bytes and/or packets across the link to device A. This occurs at a second time, denoted as T2. At block 1007, device A receives device B's counters and a timestamp for T2. Accordingly, device A exchanges interface sent/received packet/byte counters and corresponding timestamps with adjacent network node, device B, in the ACP network.

At block 1009, device A determines device A's counters at time T3 in a similar manner to block 1001. At block 1011, device A compares device A's sent counters and time stamps with the received counters and timestamp at device B. Device A may determine that an intruder has made alterations to the network when a difference in a sent packet counter and a received packet counter over a specified time period exceeds an error threshold. Device B may also perform a similar analysis. Device A and/or B may alert an application and/or an administrator when an intruder is detected. The device(s) may also tear down the connection and/or drop packets as desired.

It should be noted that FIG. 10 shows one quarter of the overall process in some examples. Repeated exchanges of counters between nodes allows for more accurate determinations. Method 1000 allows device A to establish a baseline for the inaccuracy in retrieving counters locally and on the remote Device B. The established baseline is then employed to select an accuracy tolerance. The accuracy tolerance is a threshold that indicates an acceptable variance between sent packet counters and received packet counters based on the baseline inaccuracy of the devices involved. When a difference between sent counters and received counters, or vice versa, falls outside of the accuracy tolerance, a corresponding device may determine that an attack has occurred. For example, device A may repeat the method 1000 thirty seconds later, establishing counters at times T1', T2', and T3' that are about thirty seconds later than T1, T2, T3. In such a case, the number of bytes/packets received by device B in the observation interval is B-bytes/packets at T2'-B-bytes/packets at T2. Further, the number of bytes/packets sent by device A in the observation interval is the median of bytes/packets at T1' and bytes/packets at T3' minus the median of bytes/packets at T1 and bytes/packet at T3. In such a case, the error of device A's measurement of bytes/packets for the observation interval is bytes/packets at T3'-bytes/packets at T1 minus bytes/packets at T1' minus bytes/packets at T3. If the received value is outside of the sent value plus or minus the error (e.g., either on packet or byte counters), device A can assume that an intruder is adding, removing, or modifying packets. Likewise, device B may perform the same operations as device A to determine possible man-in-the-middle attacks for packets sent by device B to device A.

Figure 11:
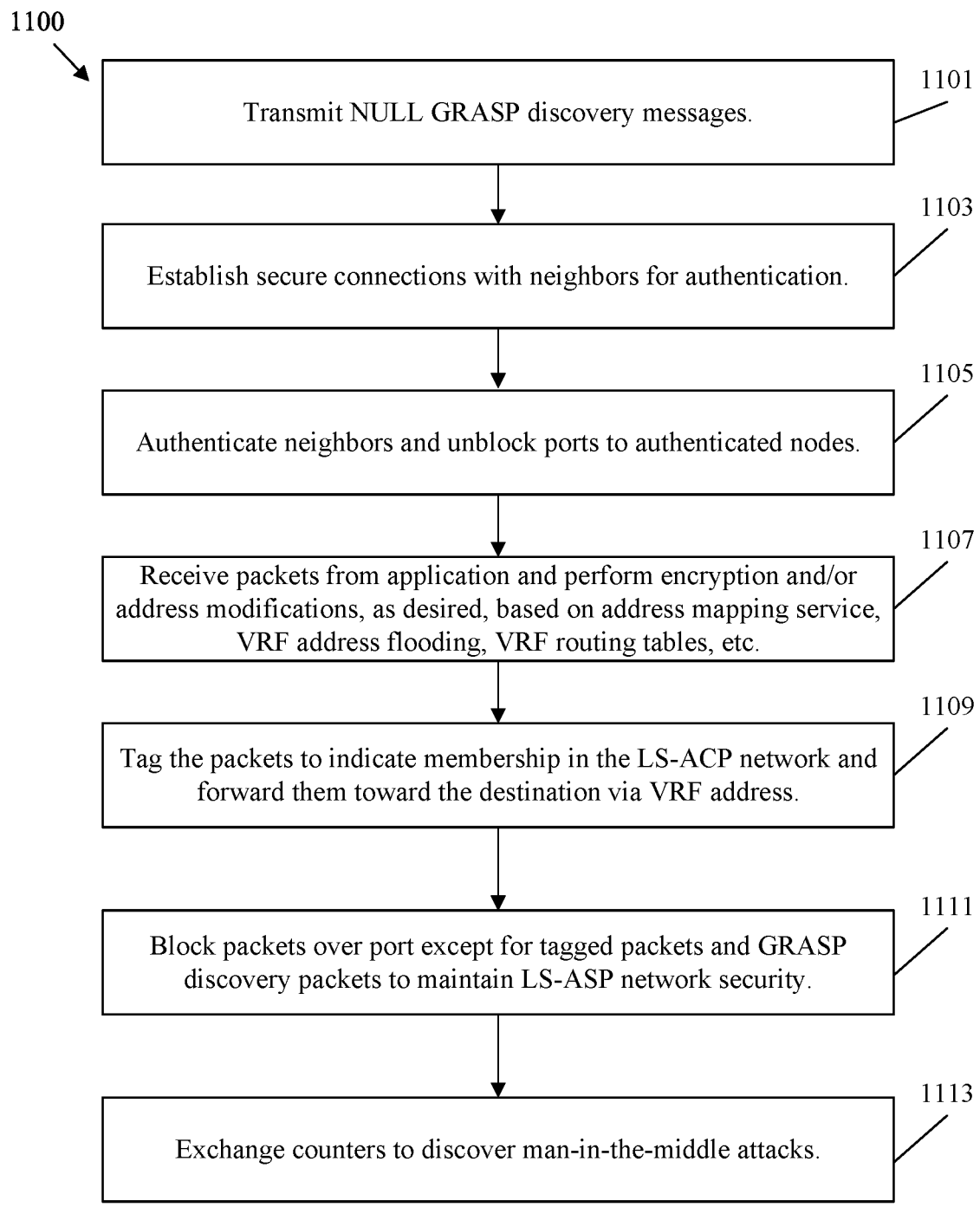
FIG. 11 is a flowchart of an example method of maintaining security in an LS-ACP network.

FIG. 11 is a flowchart of an example method 1100 of maintaining security in an LS-ACP network. Method 1100 employs the mechanisms discussed above and is provided as a summary of such mechanisms for purposes of clarity. Hence, method 1100 may be employed on networks 100, 300, 400, forwarding plane 500, and/or network device 600 and/or 900. Further, method 1100 may employ any methods discussed above, such as methods 700, 800, and/or 1000, to perform corresponding blocks in method 1100.

Method 1100 is described from the perspective of a source node, referred to as a network device, for purposes of clarity. Method 1100 may initiate when such a network device begins operation and prepares to connect to an LS-ACP network. At block 1101, the network device prepares to establish secure connection(s) with other network nodes in an LS-ACP network. Specifically, the network device transmits NULL GRASP discovery messages on various interfaces to determine the presence of adjacent network nodes. The network device then receives discovery responses from such nodes.

At block 1103, the network device establishes secure connections with neighbor nodes. Such secure connections allow for secure authentication. The connections may be secured by TLS, dTLS, and/or any other security protocol discussed herein.

At block 1105, the network device authenticates neighbor nodes by reviewing corresponding LS-ACP certificates over the secure authentication connection. Ports corresponding to the authenticated network nodes may then be unblocked. It should be noted that blocked ports prevent communication of packets except for NULL GRASP discovery related packets. This ensures that only nodes on authenticated ports have access to the LS-ACP network. Upon completion of block 1105, the network device is part of the LS-ACP network and can send/receive packets at corresponding VRF address(es).

At block 1107, packets may be received from an application. The network device may perform transparent end-to-end encryption and/or determine destination node VRF addresses as discussed above. Destination VRF addresses may be determined via several mechanisms. In one example, LS-ACP GRASP messages may be flooded across the LS-ACP network. Such messages may include both physical network addresses and corresponding VRF addresses. Further, remote nodes may respond to such messages by flooding GRASP response messages that contain the remote nodes' physical addresses and VRF addresses. This allows the nodes on the network, including the network device, to listen to such traffic and populate corresponding VRF routing/forwarding tables. In another example, a source network device may flood a LS-ACP GRASP message requesting a VRF for a destination node. The destination node may then transmit a GRASP response message directly to the source network device via unicast. The GRASP response message contains the destination node's VRF, and hence allows the source network device to route packets to the destination node via the LS-ACP network. In yet another example, the source network device queries an address mapping system that maintains a complete view of the VRF addresses for the nodes in the LS-ACP network. The address mapping system may maintain such a view by flooding GRASP messages and receiving responses, by receiving VRF addresses from nodes upon connection, etc.

Once the appropriate connections and encryptions are setup for the packets, the method 1100 proceeds to block 1109. At block 1109, the source network device begins transmitting the encrypted packets towards the remote network node across the LS-ACP network. Specifically, the source network device tags the encrypted packets to indicate membership in the LS-ACP network, for example by employ VLAN or other packet tags. The tagged packets are then forwarded toward the destination node by employing the destination node's VRF address as determined at block 1107.

At block 1111, the network device blocks all packets over the authenticated except for tagged packets and LS-ACP network discovery packets, such as GRASP discovery packets and/or responses. This approach maintains security for the LS-ACP network by dropping packets that are not either from a node attempting to join the LS-ACP network or from a node already in the LS-ACP network. Block 1111 may operate continuously during network device operation.

Further, at block 1113, the network device may exchange counters with adjacent nodes to discover man-in-the-middle attacks. Such counters may be exchanged and examined per the discussion above with respect to LS-ACP device 900 and/or method 1000. The counter exchange and comparison may also operate continuously during network device operation.

A network device comprising: a transmitter means and a receiver means to establish a secure connection with one or more network nodes as part of a Autonomic Control Plane (ACP) network, and a processor means coupled to the transmitter means and receiver means, the processor means to: receive a request from an application to initiate a connection with a destination network node, receive packets from the application for transmission toward the destination network node, when the packets from the application are unencrypted, end-to-end encrypting the unencrypted packets without notifying the application, and cause the transmitter to transmit the encrypted packets towards the destination network node across the ACP network.

A method, implemented in a network device, the method comprising: means for establishing a secure connection with one or more network nodes as part of an Autonomic Control Plane (ACP) network, means for receiving a request from an application to initiate a connection with a destination network node, means for receiving packets from the application for transmission toward the destination network node, when the packets from the application are unencrypted, means for end-to-end encrypting the unencrypted packets without notifying the application, and means for transmitting the encrypted packets towards the destination network node across the ACP network.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network device comprising:
   a transmitter and a receiver configured to establish a secure connection with one or more network nodes as part of an Autonomic Control Plane (ACP) network; and
   a processor coupled to the transmitter and the receiver, the processor configured to:
      receive a request from an application to initiate a connection with a destination network node;
      receive application data-packets from the application for transmission toward the destination network node;
      determine that the application data-packets are unencrypted;
      end-to-end encrypt the application data-packets to generate encrypted application data-packets without notifying the application in response to determining that the application data-packets are unencrypted;
      receive routing protocol data-packets;
      determine that the routing protocol data-packets are unencrypted;
      end-to-end encrypt the routing protocol data-packets to generate encrypted routing protocol data-packets in response to determining that the routing protocol data-packets are unencrypted; and
      cause the transmitter to transmit the encrypted application data-packets and the encrypted routing protocol data-packets across the ACP network.

2. The network device of claim 1, wherein the processor is further configured to perform no additional encryption when the packets from the application are encrypted by the application.

3. The network device of claim 1, wherein the application data-packets are encrypted by the processor according to a Transport layer security (TLS) protocol, a datagram transport layer security protocol (dTLS), or combinations thereof.

4. The network device of claim 1, wherein establishing the secure connection with the one or more network nodes includes:
  transmitting encryption discovery unsolicited link local (NULL) Generic Autonomic Signaling Protocol (GRASP) discovery messages to the network nodes;
  establishing a secure Transport layer security (TLS) connection for authentication; and
  unblocking ports corresponding to authenticated network nodes.

5. The network device of claim 1, wherein establishing the secure connection with the one or more network nodes further includes establishing multicast link-local communication connections with adjacent network nodes.

6. The network device of claim 1, wherein the processor is further configured to determine that the destination network node is reachable via the ACP network prior to initiating a connection with the destination network node by employing an ACP routing table.

7. The network device of claim 6, wherein the ACP routing table is populated by receiving Virtual Routing and Forwarding (VRF) addresses of network nodes in the ACP network as flooded by an ACP routing protocol.

8. The network device of claim 1, wherein the processor is further configured to determine that the destination network node is reachable via the ACP network prior to initiating a connection with the destination network node by employing an address mapping service to determine an ACP Virtual Routing and Forwarding (VRF) address for the destination network node.

9. The network device of claim 8, wherein the address mapping service:
  employs the transmitter to flood a ACP Generic Autonomic Signaling Protocol (GRASP) discovery message across the ACP network; and
  employs the receiver to receive the VRF for the destination network node in GRASP respond message in response to the GRASP discovery message.

10. The network device of claim 1, wherein transmitting the encrypted application data-packets and the encrypted routing protocol data-packets across the ACP network includes:
  tagging the encrypted application data-packets and the encrypted routing protocol data-packets to indicate membership in the ACP network; and
  blocking all packets except for tagged encrypted application data-packets and tagged encrypted routing protocol data-packets.

11. The network device of claim 1, wherein transmitting the encrypted packets towards the destination network node across the ACP network includes multicasting the encrypted packets by:
  creating a plurality of secure end-to-end connections with a plurality of adjacent network nodes; and
  unicasting the encrypted packets over the secure end-to-end connections.

12. The network device of claim 1, wherein the processor is further configured to protect the secure connection against man-in-the-middle attacks by:
  exchanging interface sent/received packet/byte counters and corresponding timestamps with adjacent network nodes in the ACP network; and
  determining an intruder when a difference in a sent packet counter and a received packet counter over a specified time period exceeds an error threshold.

13. A method, implemented in a network device, the method comprising:
  establishing, via a transmitter and a receiver, a secure connection with one or more network nodes as part of an Autonomic Control Plane (ACP) network;
  receiving, at a processor, a request from an application to initiate a connection with a destination network node;
  receiving, at the processor, application data-packets from the application for transmission toward the destination network node;
  determining, using the processor, that the application data-packets are unencrypted;
  end-to-end encrypting the application data-packets, using the processor, to generate encrypted application data-packets without notifying the application in response to determining that the application data-packets are unencrypted;
  receiving, at the processor, routing protocol data-packets;
  determining, using the processor, that the routing protocol data-packets are unencrypted;
  end-to-end encrypting the routing protocol data-packets, using the processor, to generate encrypted routing protocol data-packets in response to determining that the routing protocol data-packets are unencrypted; and
  transmitting, at the transmitter, the application data-packets and the encrypted routing protocol data-packets across the ACP network.

14. The method of claim 13, wherein the unencrypted packets are link local multicast packets for a ACP routing protocol, and wherein end-to-end encrypting the unencrypted packets includes:
  converting the unencrypted packets to a list of unicast packets; and
  encrypting the unicast packets according to a datagram transport layer security (dTLS) protocol; and
  transmitting the encrypted unicast packets as link-local unicast to neighboring network nodes.

15. The method of claim 13, wherein establishing the secure connection with the one or more network nodes includes authenticating adjacent network nodes in the ACP network according to an encryption discovery unsolicited link local (NULL) Generic Autonomic Signaling Protocol (GRASP) protocol.

16. The method of claim 13, further comprising protecting the secure connection against man-in-the-middle attacks by:
  exchanging packet counters and corresponding timestamps with adjacent network nodes in the ACP network; and
  determining an intruder when a difference in a sent packet counter and a received packet counter over a specified time period exceeds an error threshold calculated based on accuracy tolerance.

17. A non-transitory computer readable medium comprising a computer program product for use by a network device, the computer program product comprising computer executable instructions stored on the non-transitory computer readable medium such that when executed by a processor cause the network device to:
  establish a secure connection with one or more network nodes as part of an Autonomic Control Plane (ACP) network;
  receive a request from an application to initiate a connection with a destination network node;
  receive application data-packets from the application for transmission toward the destination network node;
  determine that the application data-packets are unencrypted;
  end-to-end encrypt the application data-packets to generate encrypted application data-packets without notifying the application in response to determining that the application data-packets are unencrypted;

receive routing protocol data-packets;

determine that the routing protocol data-packets are unencrypted; end-to-end encrypt the routing protocol data-packets to generate encrypted routing protocol data-packets in response to determining that the routing protocol data-packets are unencrypted; and transmit the encrypted application data-packets and the encrypted routing protocol data-packets across the ACP network.

18. The non-transitory computer readable medium of claim 17, wherein the application data-packets are encrypted according to a datagram transport layer security (dTLS) protocol and transmitted as link local Internet protocol version six (IPv6) Routing Protocol For Low Power and Lossy Networks (RPL) multicast packets.

19. The non-transitory computer readable medium of claim 17, wherein establishing the secure connection with the one or more network nodes includes authenticating adjacent network nodes in the ACP network according to a Generic Autonomic Signaling Protocol (GRASP) protocol.

20. The non-transitory computer readable medium of claim 17, wherein the computer executable instructions further cause the network device to protect the secure connection against man-in-the-middle attacks by:

exchanging packet counters and corresponding timestamps with adjacent network nodes in the ACP network; and determining an intruder when a difference in a sent packet counter and a received packet counter over a specified time period exceeds an error threshold.

* * * * *